US008046713B2

(12) United States Patent
Yamashita

(10) Patent No.: US 8,046,713 B2
(45) Date of Patent: Oct. 25, 2011

(54) DISPLAY APPARATUS, METHOD FOR DISPLAY, DISPLAY PROGRAM, AND COMPUTER-READABLE STORAGE MEDIUM

(75) Inventor: Daisuke Yamashita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 903 days.

(21) Appl. No.: 11/882,048

(22) Filed: Jul. 30, 2007

(65) Prior Publication Data

US 2008/0209358 A1 Aug. 28, 2008

(30) Foreign Application Priority Data

Jul. 31, 2006 (JP) ................................ 2006-209143
Jul. 23, 2007 (JP) ................................ 2007-191261

(51) Int. Cl.
*G06F 3/048* (2006.01)

(52) U.S. Cl. ......................... 715/788; 715/243; 345/658

(58) Field of Classification Search .................. 345/632, 345/788, 649, 651, 658; 382/195; 715/500, 715/517, 520, 781, 526, 527, 232, 238, 243, 715/244-246, 253, 730, 732, 744, 788, 799
See application file for complete search history.

(56) References Cited

U.S. PATENT DOCUMENTS

| | | | | |
|---|---|---|---|---|
| 6,298,358 | B1 * | 10/2001 | Gormish | 715/236 |
| 6,711,291 | B1 * | 3/2004 | Stubler et al. | 382/195 |
| 7,577,914 | B1 * | 8/2009 | Stuple et al. | 715/764 |
| 2002/0002570 | A1 | 1/2002 | Sakai et al. | |
| 2002/0051208 | A1 * | 5/2002 | Venable | 358/1.18 |
| 2002/0122067 | A1 * | 9/2002 | Geigel et al. | 345/788 |
| 2003/0163785 | A1 * | 8/2003 | Chao et al. | 715/517 |
| 2003/0226113 | A1 * | 12/2003 | Altman et al. | 715/520 |
| 2003/0229845 | A1 * | 12/2003 | Salesin et al. | 715/500 |
| 2005/0007299 | A1 * | 1/2005 | Gormish | 345/2.1 |
| 2005/0083330 | A1 * | 4/2005 | Crawford et al. | 345/440 |
| 2005/0094205 | A1 * | 5/2005 | Lo et al. | 358/1.18 |
| 2005/0097458 | A1 * | 5/2005 | Wilson | 715/517 |
| 2006/0048052 | A1 * | 3/2006 | Lehenbauer et al. | 715/517 |

FOREIGN PATENT DOCUMENTS

| | | | |
|---|---|---|---|
| JP | 6-274303 | A | 9/1994 |
| JP | 10-74080 | A | 3/1998 |
| JP | 11-86014 | A | 3/1999 |
| JP | 2003-108284 | A | 4/2003 |
| JP | 2003-198975 | A | 7/2003 |
| JP | 2003-308310 | A | 10/2003 |
| WO | WO-01/93097 | A2 | 12/2001 |

* cited by examiner

*Primary Examiner* — Weilun Lo
*Assistant Examiner* — Enrique Iturralde
(74) *Attorney, Agent, or Firm* — Birch, Stewart, Kolasch & Birch, LLP

(57) ABSTRACT

A mobile phone (1) includes: a blank area detection section (55) which detects a blank area whose size is determined by subtracting, from an entire area of a display screen, an image display area where an image is displayed and a character string display area where a character string is displayed; and a reposition control section (51) which changes the position or size of at least one of the image and the character string from an initial state, in such a way as to allow the image and the character string to be displayed in a single display screen. On this account, an image and a character string associated therewith are efficiently displayable in a single screen.

10 Claims, 17 Drawing Sheets

| | REPOSITION | ORDER OF PREFERENCE |
|---|---|---|
| TARGET IMAGE | POSSIBLE | 2 |
| ASSOCIATED CHARACTER STRING | POSSIBLE | 1 |

DISPLAY APPARATUS, METHOD FOR DISPLAY, DISPLAY PROGRAM, AND COMPUTER-READABLE STORAGE MEDIUM

This Nonprovisional application claims priority under 35 U.S.C. §119(a) on Patent Application No. 209143/2006 filed in Japan on Jul. 31, 2006 and Patent Application No. 191261/2007 filed in Japan on Jul. 23, 2007, the entire contents of which are hereby incorporated by reference.

FIELD OF THE INVENTION

The present invention relates to a display apparatus which displays an image and a character string associated with the image in the same display screen of the display apparatus, a method for display, a display program, and a computer-readable storage medium.

BACKGROUND OF THE INVENTION

In accordance with the improvement in functions of mobile information terminals, image data which has typically been received by large information terminals such as desktop PCs becomes receivable and viewable by mobile information terminals such as mobile phones.

Since a mobile information terminal has a small display screen, characters in an image to be viewed may be blurred due to downsizing of the image and may not be illegible.

In this regard, Japanese Laid-Open Patent Application No. 2003-108284 (published on Apr. 11, 2003) discloses an image display apparatus arranged such that a display area of the image display apparatus is divided into two areas, and an image is displayed in one sub display area whereas a, character string in the image is displayed in the other sub display area.

This conventional art, however, is disadvantageous in that, since the size of the sub display area for character string is fixed, the sub display area may not be possible to display all of the character string if the number of the characters is large or if the character size is increased in consideration of viewability. Also, on the other hand, when the number of characters to be displayed is small, a redundant part of the sub display area cannot be used for displaying an image. The display area is therefore not effectively used.

SUMMARY OF THE INVENTION

The objective of the present invention is to provide a display apparatus which can efficiently display an image (main display data) and a character string (auxiliary display data) associated therewith in a single screen, a method for display, a display program, and a computer-readable storage medium.

To achieve the objective above, a display apparatus of the present invention, displaying main display data and auxiliary display data associated with the main data, includes: display position determining means for determining display positions of the main display data and the auxiliary display data in a display screen; reposition necessity determining means for determining whether it is necessary to perform a reposition process by which at least one of the positions of the main display data and the auxiliary display data is changed; blank area detection means for detecting a blank area whose size is determined by subtracting, from an entire area of the display screen, a main display data display area where the main display data is displayed and an auxiliary display data display area where the auxiliary display data is displayed; and reposition means for changing at least one of the positions of the main display data and the auxiliary display data, if the reposition necessity determining means determines that the reposition process is necessary.

According to the arrangement above, the display position determining means determines the display positions of the main display data and the auxiliary display data in the display screen. The reposition necessity determining means determines whether it is necessary to change at least one of the display positions of the main display data and the auxiliary display data, which have been determined by the display position determining means. In other words, the reposition necessity determining means determines if it is necessary to perform the reposition process. The reposition means performs the reposition process by using the blank area detected by the blank area detection means, in case where the reposition necessity determining means determines that the reposition process is necessary.

Therefore, using the blank area, it is possible to efficiently display the main display data and the auxiliary display data associated with the main display data, in a single display screen. Furthermore, the main display data and the auxiliary display data are displayed with good viewability.

To achieve the objective above, a display apparatus of the present invention, which adjusts a position of at least one of an image and a character string associated with the image, in order to display the image and the character string in a single display screen of the display apparatus, includes: blank area detection means for detecting a blank area whose size is determined by subtracting, from an entire area of the display screen, an image display area where the image is displayed and a character string display area where the character string is displayed; and reposition means for changing, by using the blank area, a position or size of at least one of the image and the character string from an initial state, in such a way as to allow the image and the character string to be displayed in the single display screen.

To achieve the objective above, a method for display of the present invention, for a display apparatus which adjusts a position of at least one of an image and a character string associated with the image, in order to display the image and the character string in a single display screen of the display apparatus, includes the steps of: detecting a blank area whose size is determined by subtracting, from an entire area of the display screen, an image display area where the image is displayed and a character string display area where the character string is displayed; and changing, by using the blank area, a position or size of at least one of the image and the character string from an initial state, in such a way as to allow the image and the character string to be displayed in the single display screen.

According to the arrangements above, the blank area detection means detects a blank area in the display screen, and the reposition means changes, by using the blank area detected by the blank area detection means, the position or size of an image and/or a character string from an initial state, in such a way as to allow these display targets to be displayable within the boundary of a single display screen.

In this manner, an image and a character string associated therewith are efficiently displayable in a single display screen by using a blank area, and hence the image and the character string are displayed with good viewability.

Additional objects, features, and strengths of the present invention will be made clear by the description below. Further, the advantages of the present invention will be evident from the following explanation in reference to the drawings.

DESCRIPTION OF THE EMBODIMENTS

The following will describe an embodiment of the present invention with reference to FIGS. 1-21. Although a mobile phone 1 is dealt with as an example of a display apparatus of the present invention, the display apparatus of the present invention is not limited to the mobile phone. The display apparatus of the present invention may be any types of display apparatuses on condition that an image (main display data) and a character string (auxiliary display data) associated with the image are displayed in the same display screen of the display apparatus. It is noted that the main display data is not necessarily an image and the auxiliary display data is not necessarily a character string.

Figure 2:
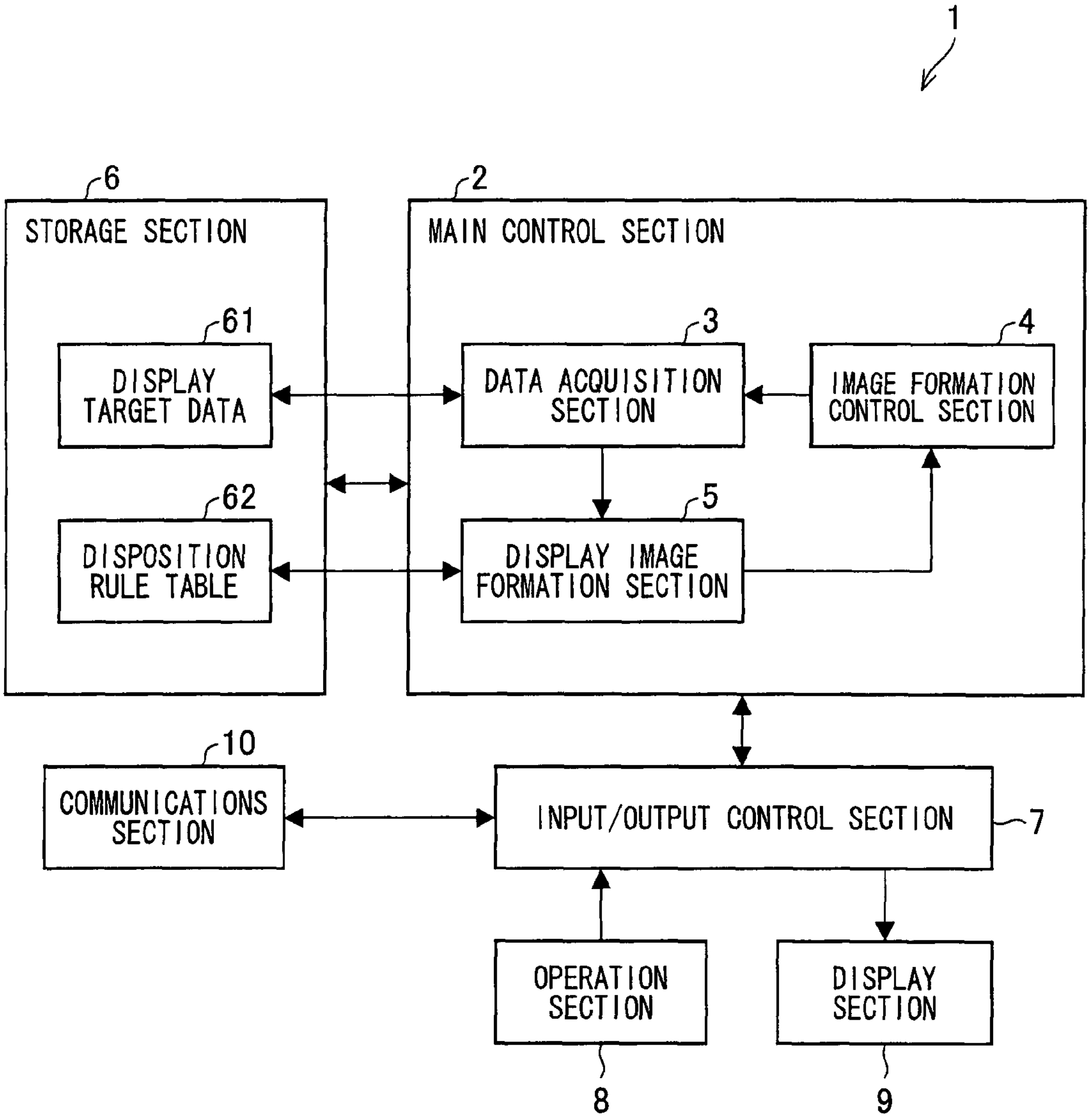
FIG. 2 is a functional block diagram showing the mobile phone of the embodiment of the present invention.

FIG. 2 is a functional block diagram showing the mobile phone 1. As shown in the figure, the mobile phone 1 includes a main control section 2, a storage section 6, an input/output control section 7, an operation section 8, a display section 9, and a communications section 10. The mobile phone 1 also includes members to function as a mobile phone, such as a speaker and a microphone. FIG. 2, however, does not illustrate such members.

The main control section 2 includes a data acquisition section 3, an image formation control section 4, and a display image formation section 5.

The data acquisition section 3 obtains, from a storage section 6, data (hereinafter, display target data 61) for display on a display section 9, and outputs the display target data 61 to the display image formation section 5. The display target data 61 is basically constituted by a target image to be displayed and a character string (hereinafter, associated character string) which is associated with the target image. Alternatively, the display target data 61 may be constituted only by an image or only by a character string. It is noted that the mobile phone 1 is effective for processing display target data constituted by a target image and an associated character string.

The display image formation section 5 adjusts relative positions of a target image and an associated character string, and generates a display image to be displayed on the display section 9. Details of the display image formation section 5 will be given later.

The image formation control section 4 controls the data acquisition section 3 and the display image formation section 5.

The storage section 5 stores display target data 61 and a disposition rule table 62. The disposition rule table 62 stores rules to determine positions of the target image and the associated character string in the display target data 61, and indicates the order of preference of display areas, i.e. indicates that a display area of the target image or a display area of the associated character string is preferentially moved. The disposition rule table 62 is referred to by the display image formation section 5 as discussed later.

Figures 19, 20:
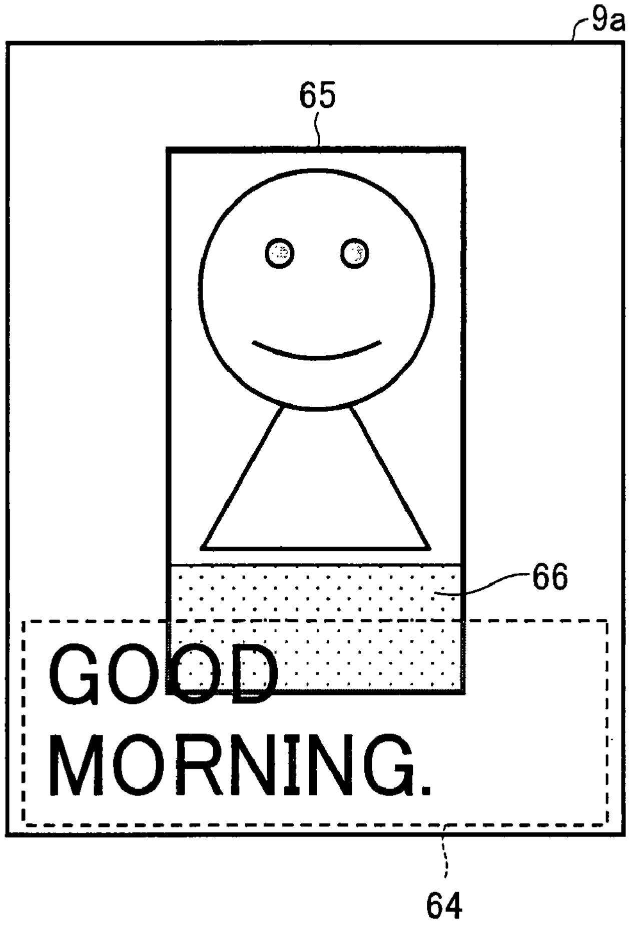
FIG. 19 shows a state in which the character string display area is overlapped with the rewritable area and the associated character string is displayed in two lines, so that the character string display area has become displayable in the display screen.
FIG. 20 shows an example of a table indicating order of preference, which is included in a disposition rule table.

FIG. 20 shows an example of a table indicating an order of preference, included in the disposition rule table 62. The figure shows a disposition table which indicates that both a target image and an associated character string can be repositioned, and the movement of the associated character string is preferred to the movement of the target image (i.e. the order of preference of the associated character string is "1"). In addition to information indicating whether reposition is possible and information indicating an order of preference for reposition, the disposition rule table 62 includes (i) information indicating default states (initial positions, initial display direction and initial sizes) of a target image and an associated character string and (ii) information (reposition rules) indicating how a target image and/or an associated character string is moved for reposition of the target image and/or the associated character and how the display direction is changed. These sets of information, however, are not shown in FIG. 20.

The operation section 8 is provided to receive an instruction from the user, and has plural operating keys.

The display section 9 displays a display image generated by the display image formation section 5. An example of the display section 9 is a liquid crystal display apparatus.

The communications section 10 receives display target data from an external apparatus such as a server.

The input/output control section 7 receives signals from the operation section 8, the display section 9, and the communications section 10, performs signal conversion, and outputs the converted signals to the main control section 2.

(Display Image Formation Section 5)

Figure 1:
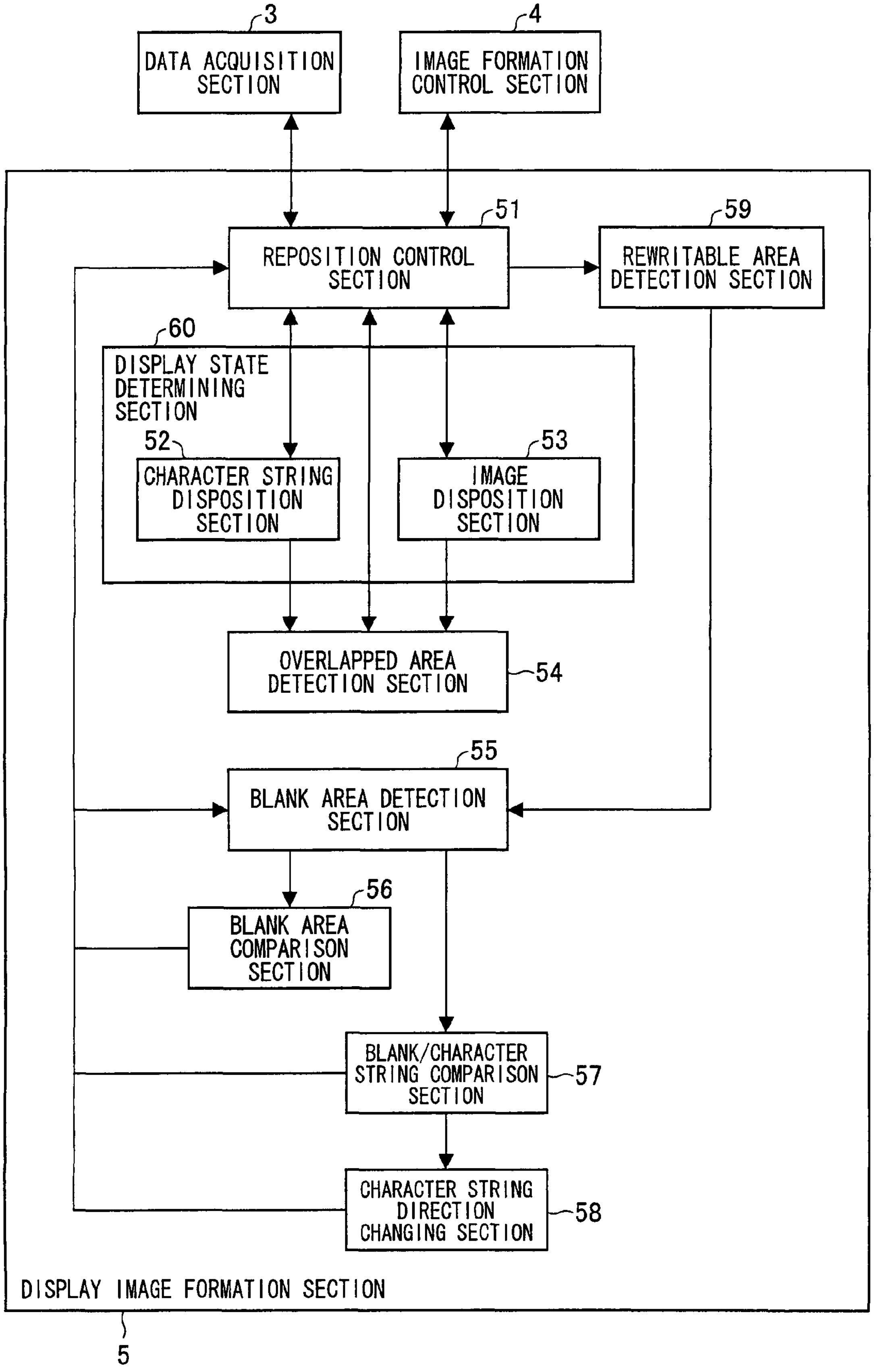
FIG. 1 is a functional block diagram showing a display image formation section of a mobile phone of an embodiment of the present invention.

FIG. 1 is a functional block diagram showing the display image formation section 5. As shown in the figure, the display image formation section 5 includes: a reposition control section 51 (reposition means); a display state determining section (display position determining means, reposition means) 60 including a character string disposition section 52 (reposition means) and an image disposition section 53 (reposition means); an overlapped area detection section (reposition necessity determining means) 54, a blank area detection section 55 (blank area detection means), a blank area comparison section 56 (blank comparison means), a blank/character string comparison section 57 (area comparison means), a character string direction changing section 58 (character string direction changing means), and a rewritable area detection section 59 (rewritable area detection means).

The reposition control section 51 controls the sections of the display image formation section 5, so as to generate, by using a blank area, a display image by adjusting the position or size of at least one of the image and the character string in such a manner that the image and the character string are displayable in the same display screen, as discussed below. In other words, the reposition control section 51 changes the position or size of the image display area and/or the character string display area from the initial position or size. The reposition control section 51 outputs the generated display image to the image formation control section 4.

The display state determining section 60 includes the character string disposition section 52 and the image disposition section 53, and determines display states (display positions and sizes) of the target image and associated character string in the display screen of the display section 9. In particular, the display state determining section 60 determines the initial states (particularly initial display positions) before a below-described reposition process.

The character string disposition section 52 determines the display area of the associated character string (hereinafter, character string display area), based on the disposition rules indicated by the disposition rule table 62. The character string disposition section 52 outputs, to the overlapped area detection section 54, coordinates of the character string display area.

The image disposition section 53 determines the display area of the target image (hereinafter, image display area), with reference to the disposition rules indicated by the disposition rule table 62. The image disposition section 53 outputs, to the overlapped area detection section 54, coordinates of the image display area.

The overlapped area detection section 54 judges whether the character string display area and the image display area are displayed within the boundary of the display screen, and also judges whether the character string display area and the image display area are overlapped with one another. The overlapped area detection section 54 then outputs the judgment results to the reposition control section 51. In other words, the overlapped area detection section 54 determines whether it is necessary to perform a reposition process by which at least one of the display positions of the target image and the associated character string, which have been determined by the display state determining section 60, and outputs the determination result to the reposition control section 51.

The discussion below assumes that the overlapped area detection section 54 determines that the reposition process is necessary when either the character string display area or the image display area goes beyond the boundary of the display screen or the character string display area is overlapped with the image display area. However, conditions in which the overlapped area detection section 54 determines that the reposition process is necessary are not limited to the above. For example, the overlapped area detection section 54 may determine that the reposition process is necessary when the distance between the target image and the associated character string is shorter than a predetermined length. Details of the processes in the overlapped area detection section 54 will be given below.

The blank area detection section 55 detects the size (or area) of a blank area around the image display area. The blank area is figured out by subtracting the image display area and the character string display area from the entire area of the display screen of the display section 9 (this entire area will be hereinafter referred to as entire display area). The blank area detection section 55 outputs, to the blank area comparison section 56, information in regard to the detected size of the blank area (hereinafter, blank area information). How the blank area is detected by the blank area detection section 55 will be discussed in detail later. As discussed below, the size of the blank area indicates the distances from the sides of the image display area 63 to the sides of the display screen 9*a* (see FIG. 6).

If information in regard to the rewritable area is supplied from the rewritable area detection section 59, the blank area detection section 55 assumes this rewritable area as blank area, and adds the rewritable area to the blank area which has been detected.

The blank area comparison section 56 receives the blank information from the blank area detection section 55, and compares the size of a blank area above the image display area with the size of a blank area below the image display area. Also, the blank area comparison section 56 compares the size of a blank area on the left side of the image display area with the size of a blank area on the right side of the image display area. The blank area comparison section 56 then outputs the comparison results to the reposition control section 51.

The blank/character string comparison section 57 compares (i) the size of the character string display area with (ii) either the total size of the blank areas on the right side and left side of the image display area or the total size of the blank areas above and below the image display area. The blank/character string comparison section 57 then outputs the comparison result to the reposition control section 51.

The character string direction changing section 58 rotates the display direction of the character string display area for 90°, if the total size of the blank areas on the right side and left side of the image display area or the total size of the blank areas above and below the image display area is larger than the size of the character string display area. In other words, the character string direction changing section 58 changes a horizontally-written character string to a vertically-written character string, and vice versa.

The rewritable area detection section 59 detects a rewritable area in the target image included in the display target data 61. The rewritable area is an area where an amount of information is small, in the target image. In the present embodiment, the rewritable area is an area in which a variation (dispersion) of brightness values in the target image is below a predetermined threshold. An example of the rewritable area is an area with a single color. In other words, rewritable area detection section 59 detects, as a rewritable area, an area of the target image where dispersion of brightness values is below a predetermined threshold.

Figure 3:
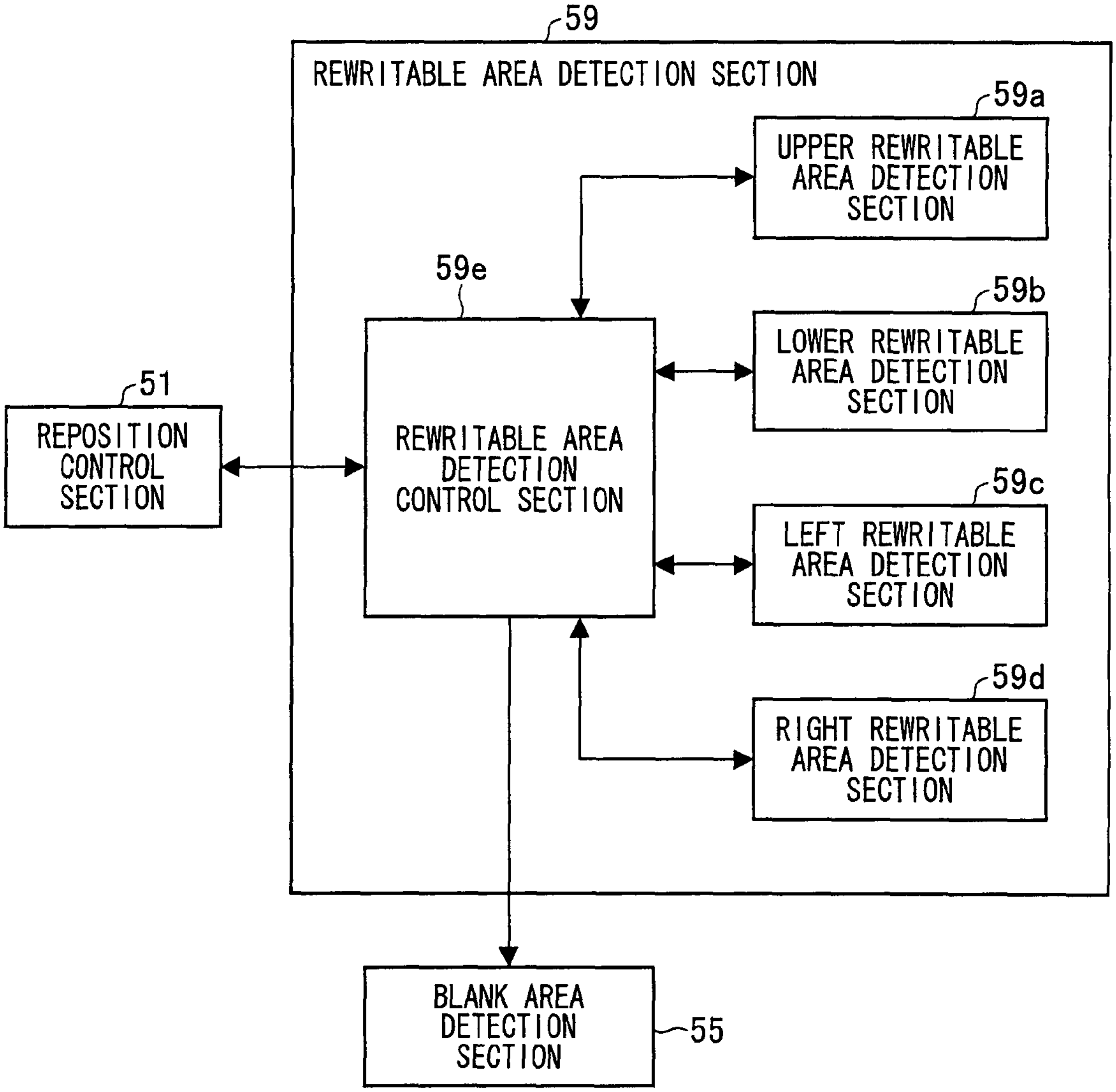
FIG. 3 is a functional block diagram showing a rewritable area detection section of the mobile phone.

FIG. 3 is a functional block diagram showing the rewritable area detection section 59. As shown in the figure, the rewritable area detection section 59 includes an upper rewritable area detection section 59*a*, a lower rewritable area detection section 59*b*, a left rewritable area detection section 59*c*, a right rewritable area detection section 59*d*, and a rewritable area detection control section 59*e*.

The upper rewritable area detection section 59*a*, the lower rewritable area detection section 59*b*, the left rewritable area detection section 59*c*, and the right rewritable area detection section 59*d* detect respective rewritable areas above, below, on the left side, and on the right side of the target image, and output the detection results to the rewritable area detection control section 59*e*.

The rewritable area detection control section 59*e* controls the upper rewritable area detection section 59*a*, the lower rewritable area detection section 59*b*, the left rewritable area detection section 59*c*, and the right rewritable area detection section 59*d*, sums up the acquired detection results regarding rewritable areas, and outputs, to the blank area detection section 55, rewritable area information indicating the position and size of the rewritable area.

Details of the processes in the rewritable area detection section 59 will be discussed later.

(Data Structure of Display Target Data 61)

Figure 4:
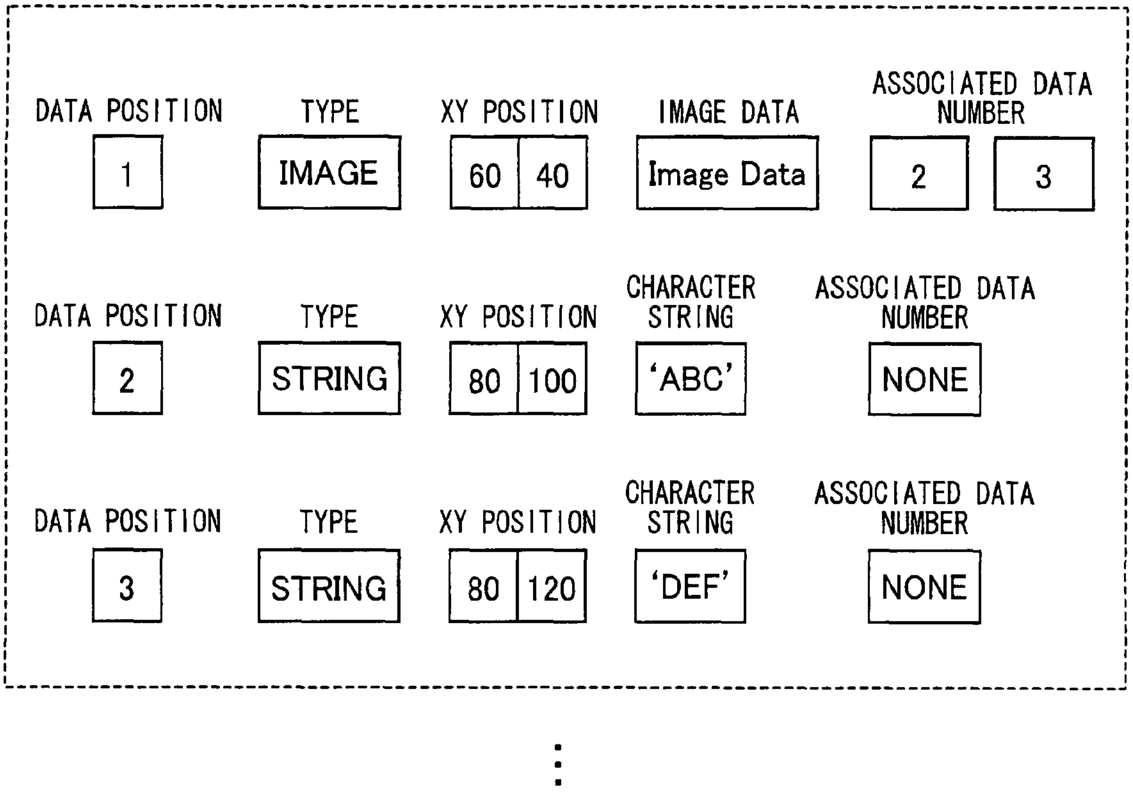
FIG. 4 outlines an example of a data structure of display target data.

FIG. 4 outlines an example of a data structure of the display target data 61. In the figure, "DATA POSITION" is information for specifying a display target element (target image or associated character string) included in the display target data 61. In the present case, "DATA POSITION" is a value indicating what is the rank of the display target element from the top of the display target data 61.

The item "TYPE" indicates whether the display target element is a target image or an associated character string. The item "IMAGE" indicates that the display target element is a target image, whereas the item "STRING" indicates that the display target element is an associated character string.

Indicated by "XY POSITION" is XY coordinates of the display target element in the display area. The XY coordinates are a coordinate system in which, assuming that the upper left corner of the display screen is X=0 and Y=0, X increases towards the right side whereas Y increases towards the bottom.

The item "ASSOCIATED DATA NUMBER" indicates how display target elements relate to one another. If a number is stored in this item, there is a parental relation such that the data is a parent of the display target element indicated by the associated data number. Display target elements having parental relations are basically displayed in the same display screen, and positions thereof can be independently changed in the screen.

In other words, when "ASSOCIATED DATA NUMBER" is not "NONE", the display target element is a target image (main display data), whereas, when "ASSOCIATED DATA NUMBER" is "NONE", the display target element is an associated character string (auxiliary display data). In other words, main display data is display data which is not associated with auxiliary display data. It is possible to tell whether a display target element is main display data or auxiliary display data, by checking whether the associated data number is "NONE" or not.

In the example shown in FIG. 4, the image whose data position is "1" is associated with the character strings whose data positions are "2" and "3". The character string whose data position is "2" and the character string whose data position is "3" are a series of character strings but exist as two independent character strings. In this way, a series of character strings may be divided into plural independent character strings and associated with a target image. In other words, the number of associated character string associated with a single target image is either one or more than one.

Contents of a target image and an associated character string included in the display target data 61 are not particularly limited. For example, a target image may be a cartoon character whereas an associated character string may be words of the character. Alternatively, a target image may be a photo taken by the user whereas an associated character string may be an explanation of the photo.

An associated character string may or may not have a background. That is to say, when an associated character string is overlapped with a target image, the associated character string may be see-through or the target image may be completely hidden at the overlapping area.

Alternatively, the target image may be a moving image and the associated character string may be an image created by converting characters into an image.

(Example of How Display Target Data 61 is Displayed)

Figure 5:
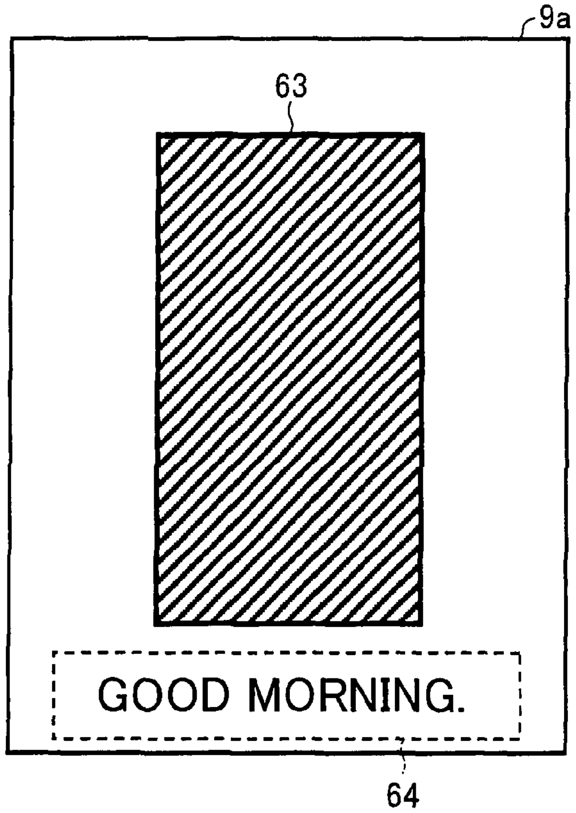
FIG. 5 shows an example of a state where a target image and an associated character string are displayed in the same display screen.

FIG. 5 shows an example of how display target data 61 (target image and associated character string) is displayed in the display screen 9*a* of the display section 9. As shown in the figure, a target image and an associated character string are displayed so that a rectangular image display area 63 for the target image is not overlapped with a character string display area 64 showing the associated character string "Good Morning", and these display areas 63 and 64 are displayed within the boundary of the display screen 9*a*.

Figure 6:
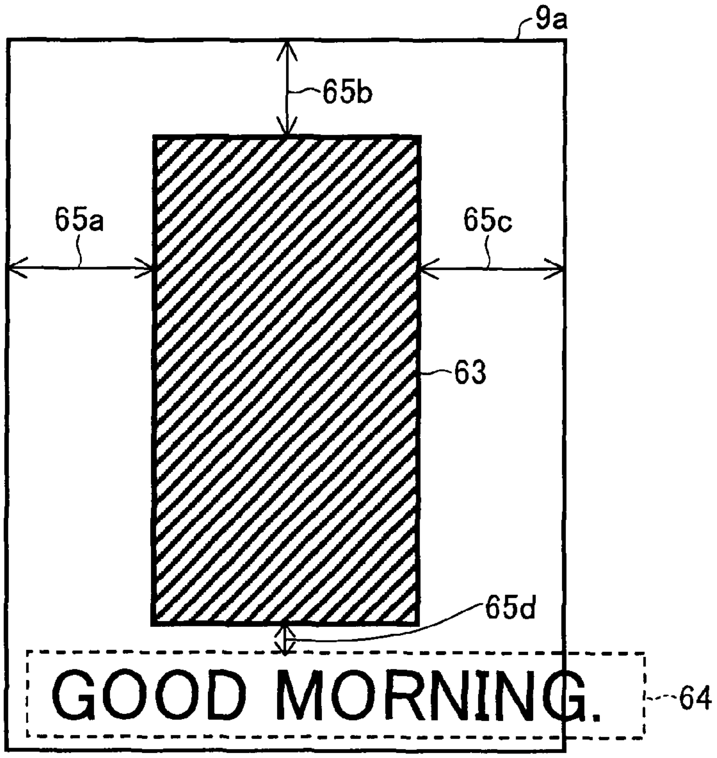
FIG. 6 shows a state where the size of the associated character string shown in FIG. 5 has been increased.

FIG. 6 outlines a state where the associated character string (i.e. character string display area 64) shown in FIG. 5 has been enlarged. As shown in FIG. 6, in case where the size of the associated character string is increased, the associated character string may not be displayable within the boundary of the display screen 9*a*. Such a change in the size of the associated character string is carried out in response to an instruction from the user. If the associated character string is not displayable within the boundary of the display screen 9*a*, the user cannot see a part of the associated character string. Also, although not illustrated in the figures, a part of either the target image or the associated character string cannot be seen when the image display area 63 and the character string display area 64 are overlapped with one another. In such cases, the display image formation section 5 adjusts relative positions of the image display area 63 and the character string display area 64.

Typical examples of the aforesaid initial state are a state where the associated character string goes beyond the boundary of the display screen 9*a* or a state where the image display area 63 and the character string display area 64 are overlapped with one another. Alternatively, to facilitate viewability, an image display area 63 and/or a character string display area 64 which is/are not in the aforesaid state may be repositioned. In the present embodiment, the aforesaid initial states indicate that a change instruction (instruction to change the size and/or display position of the target image and/or the associated character string) input by the user through the operation section 8 is reflected to the display states of the target image and the associated character string which have been determined by the display state determining section 60.

(Blank Area Detection Method by Blank Area Detection Section 55)

The following will describe a blank area detection method by the blank area detection section 55, with reference to FIG. 6.

The blank area detection section 55 figures out the distances between the sides of the image display area 63 and the sides of the display screen 9*a* (distances indicated by arrows 65*a*-65*c* in FIG. 6), based on the coordinates of each side (outer periphery) of the image display area 63. If a character string display area 64 exists between the sides of the image display area 63 and the sides of the display screen 9*a*, the blank area detection section 55 figures out the distance between the side of the image display area 63 and the side of the character string display area 64 (i.e. the distance indicated by the arrow 65*d*). As the blank area information indicates the size of the blank area, the blank area detection section 55 outputs the detected distance to the blank area comparison section 56.

Alternatively, based on the aforesaid distances and the size of the display screen, the blank area detection section 55 figures out the sizes of blank areas around (above, below, left of, and right of) the image display area 63, and outputs the sizes of the blank areas thus figured out to the blank/character string comparison section 57.

Alternatively, receiving below-discussed rewritable area information from the rewritable area detection section 59, the blank area detection section 55 adds the size of the rewritable area to the sizes of the blank areas which have already been figured out. In other words, the blank area detection section 55 assumes the rewritable area as a blank area.

The blank area detection by the blank area detection section 55 is not limited to the above. For example, receiving rewritable area information, the blank area detection section 55 may recognize, as a new image display area 63, an area worked out by subtracting the rewritable area from the image display area 63, and then the blank area detection section 55 may figure out the size of a blank area again.

(Rewritable Area Detection Method by Rewritable Area Detection Section 59)

Figure 7:
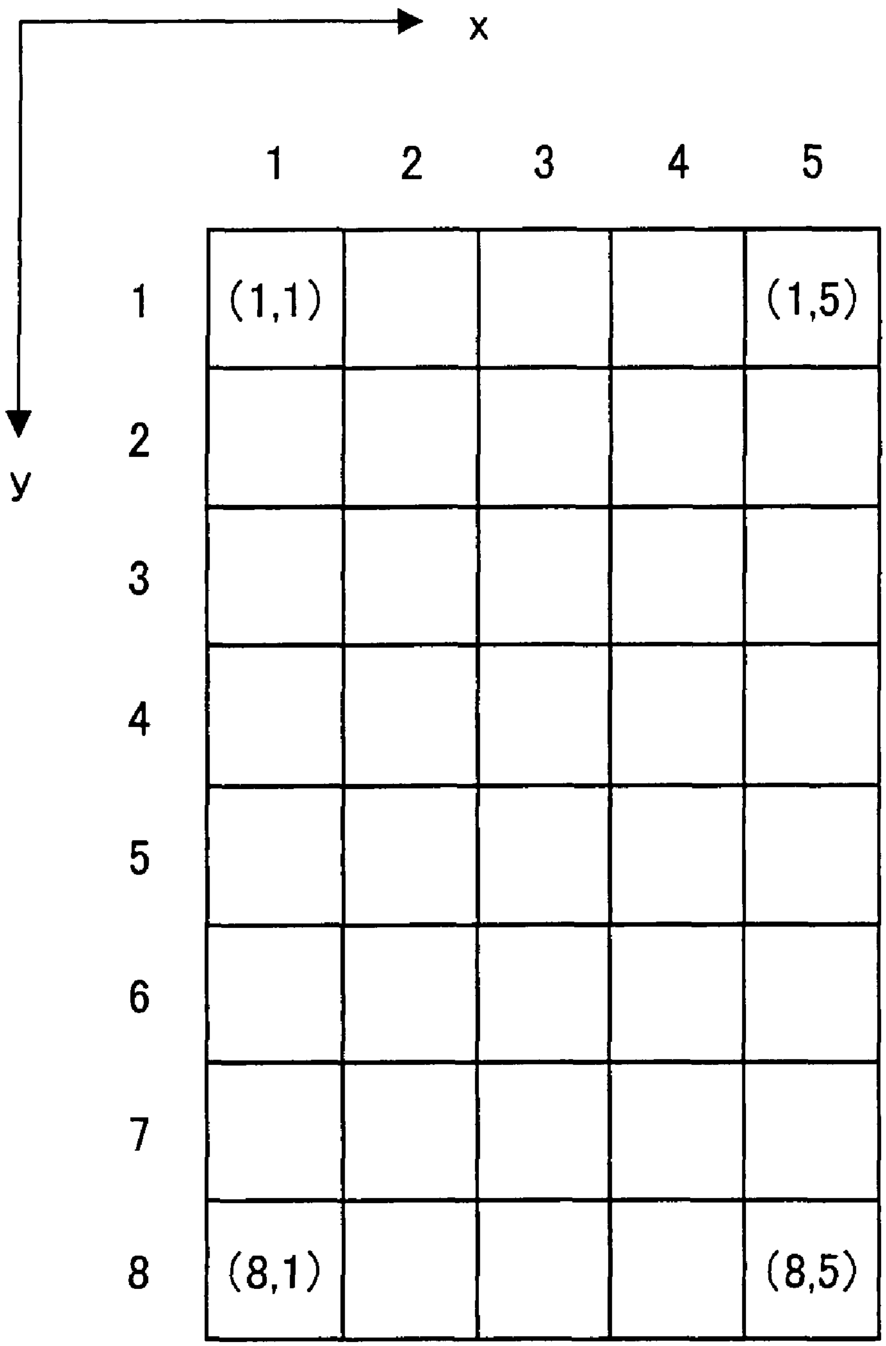
FIG. 7 illustrates a method of detecting a rewritable area in a target image.

Referring to FIG. 7, the following will discuss a rewritable area detection method by the rewritable area detection section 59. FIG. 7 illustrates a method of detecting a rewritable area in a target image. As shown in the figure, the target image is constituted by plural pixels provided along the height direction (Y direction in FIG. 7) and the width direction (X direction in FIG. 7) The figure illustrates, as an example, a 8×5 target image in which 8 pixels are provided in the Y axis direction and 5 pixels are provided in the X axis direction.

The rewritable area detection section 59 detects a rewritable area by detecting, in a target image, whether or not the dispersion of brightness values falls within a predetermined range. More specifically, each of the upper rewritable area detection section 59*a*, the lower rewritable area detection section 59*b*, the left rewritable area detection section 59*c*, and the right rewritable area detection section 59*d* of the rewritable area detection section 59 moves a target row (or target column) of the target image, which is the target of detection, from a side (target side) of the target image toward the side opposing the target side. Then each of the rewritable area detection sections figures out, in regard to the target row (or target column), a difference between a brightness value of a pixel (target pixel) and a brightness value of a pixel neighboring to the target pixel, and determines whether the difference falls within a predetermined range. If, in regard to the target row (or target column), all of the differences fall within the predetermined range, each of the rewritable area detection section adds the target row (or target column) as a rewritable row (or rewritable column).

Figure 8:
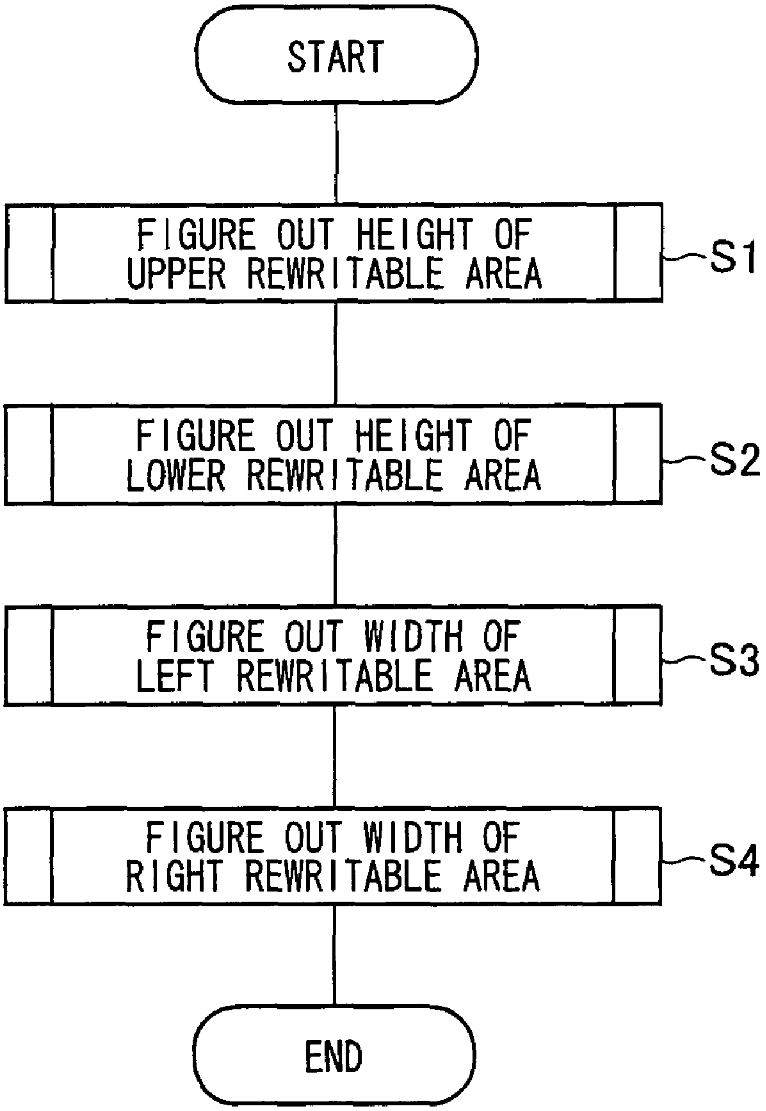
FIG. 8 is a flowchart showing the flow of processes in the rewritable area detection section.

The following will describe the flow of processes in the rewritable area detection section 59. FIG. 8 is a flowchart showing the flow of processes in the rewritable area detection section 59.

Receiving a rewritable area detection instruction which is supplied from the reposition control section 51 and instructs to detect a rewritable area, the rewritable area detection control section 59*e* outputs, to the upper rewritable area detection section 59*a*, an instruction to detect an upper rewritable area. The upper rewritable area indicates a rewritable area located above the central part of the target image.

Receiving the instruction, the upper rewritable area detection section 59*a* figures out the height (number of pixels in the Y axis direction) of the upper rewritable area, and outputs the result to the rewritable area detection control section 59*e* (S1).

Thereafter, in similar manners, the rewritable area detection section 59*e* serially outputs instructions to detect the lower, left, and right rewritable areas to the lower rewritable area detection section 59*b*, the left rewritable area detection section 59*c*, and the right rewritable area detection section 59*d*.

Receiving the instruction, the lower rewritable area detection section 59*b* figures out the height (number of pixels in the Y axis direction) of the lower rewritable area, and outputs the result to the rewritable area detection section 59*e* (S2).

Receiving the instruction, the left rewritable area detection section 59*c* figures out the width (number of pixels in the X axis direction) of the left rewritable area and outputs the result to the rewritable area detection section 59*e* (S3).

Receiving the instruction, the right rewritable area detection section 59*d* figures out the width (number of pixels in the X axis direction) of the right rewritable area and outputs the result to the rewritable area detection section 59*e* (S4).

Receiving the results in regard to the respective rewritable areas, the rewritable area detection section 59*e* sums up the results and outputs the sum-up to the blank area detection section 55, as rewritable area detection information.

The order of detecting the upper, lower, left, and right rewritable areas may be optionally determined. Alternatively, the rewritable areas may be concurrently detected.

(Details of Rewritable Area Detection Process)

Figure 9:
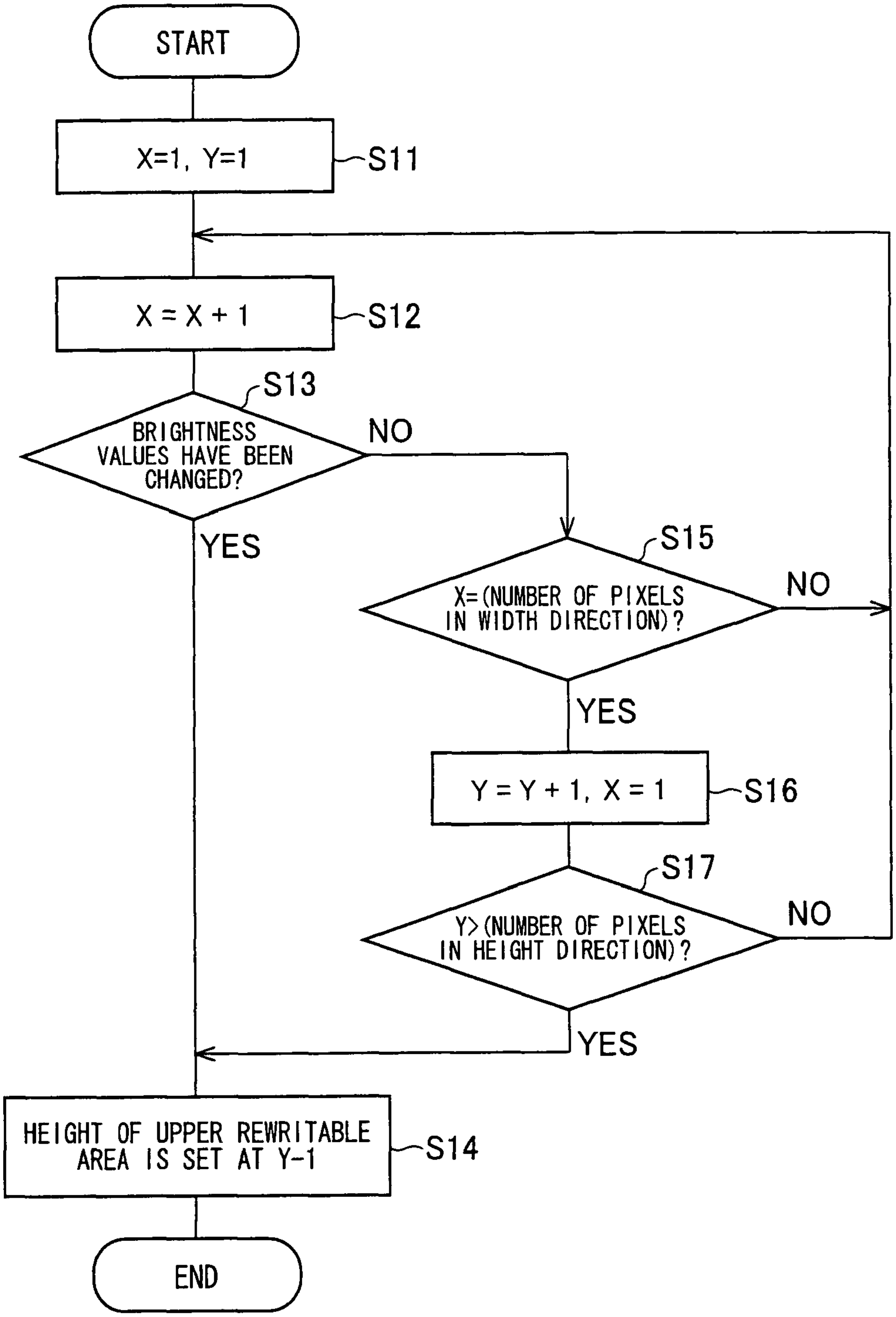
FIG. 9 is a flowchart showing the flow of processes in an upper rewritable area detection section of the rewritable area detection section.

The following will describe the flow of processes in the upper rewritable area detection section 59*a*, with reference to FIG. 9. FIG. 9 is a flowchart showing the flow of processes in the upper rewritable area detection section 59*a*. Receiving an instruction which is supplied from the rewritable area detection section 59*e* and instructs to detect an upper rewritable area, the upper rewritable area detection section 59*a* sets the coordinates counter (Y, X) thereof at X=1 and Y=1 (S1).

Then the upper rewritable area detection section 59*a* adds 1 to X, and figures out a difference between a brightness value of the pixel indicated by the coordinate counter before the addition of 1 and a brightness value of the pixel indicated by the coordinate counter after the addition of 1. For example, the upper rewritable area detection section 59*a* figures out a difference between (i) a brightness value of a pixel at (1, 1) (first row and first column) and (ii) a brightness value of a pixel at (1, 2) (first row and second column).

Thereafter, the upper rewritable area detection section 59*a* determines whether the difference falls within a predetermined range (S13). In other words, the upper rewritable area detection section 59*a* judges whether the brightness value has varied beyond a predetermined range.

If the difference does not fall within the predetermined range (YES in S13), the upper rewritable area detection section 59*a* sets the height of the upper rewritable area at a value figured out by subtracting 1 from the value Y of the coordinate counter at the moment, and outputs the information in regard to the height to the rewritable area detection section 59*e* (S14). For example, if the coordinate counter indicates (1, 2), the height of the upper rewritable area is 0.

In the meanwhile, if the difference falls within the predetermined range (NO in S13), the upper rewritable area detection section 59*a* determines if the value X of the coordinate counter at the moment is identical with the number of pixels in the width direction (X axis direction) (S14).

If the X value is not identical with the number of pixels in the width direction (NO in S15), 1 is added to the X value and the difference is figured out again (return to S12).

If the X value is identical with the number of pixels in the width direction (YES in S15), the upper rewritable area detection section 59*a* adds 1 to the Y value of the coordinate counter and sets the X value at 1 (S16). In other words, after all comparisons of brightness values in regard to the target row are finished, the upper rewritable area detection section 59*a* sets the next row as a new target row.

The upper rewritable area detection section 59*a* then determines if the Y value of the coordinate counter is higher than the number of pixels in the height direction (Y axis direction).

If the Y value of the coordinate counter is not larger than the number of pixels in the height direction (NO in S17), 1 is added to the X value and the difference is figured out again (return to S12).

On the other hand, if the Y value of the coordinate counter is larger than the number of pixels in the height direction (YES in S17), the upper rewritable area detection section 59*a* sets the height of the upper rewritable area at a value figured out by subtracting 1 from the coordinate counter at the moment, and outputs the information in regard to the height to the rewritable area detection section 59*e* (S14).

Figure 10:
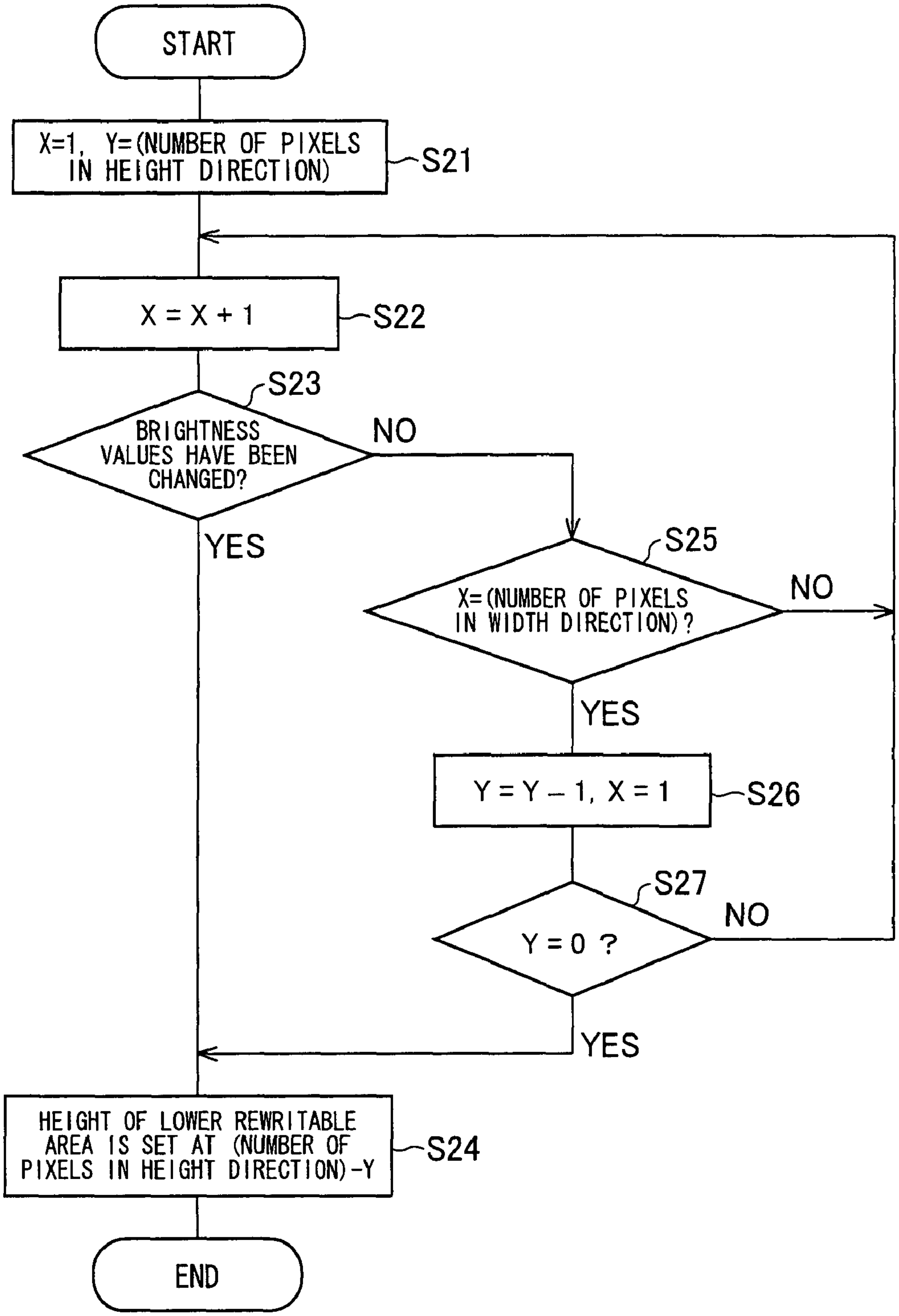
FIG. 10 is a flowchart showing the flow of processes in a lower rewritable area detection section in the rewritable area detection section.
Figure 11:
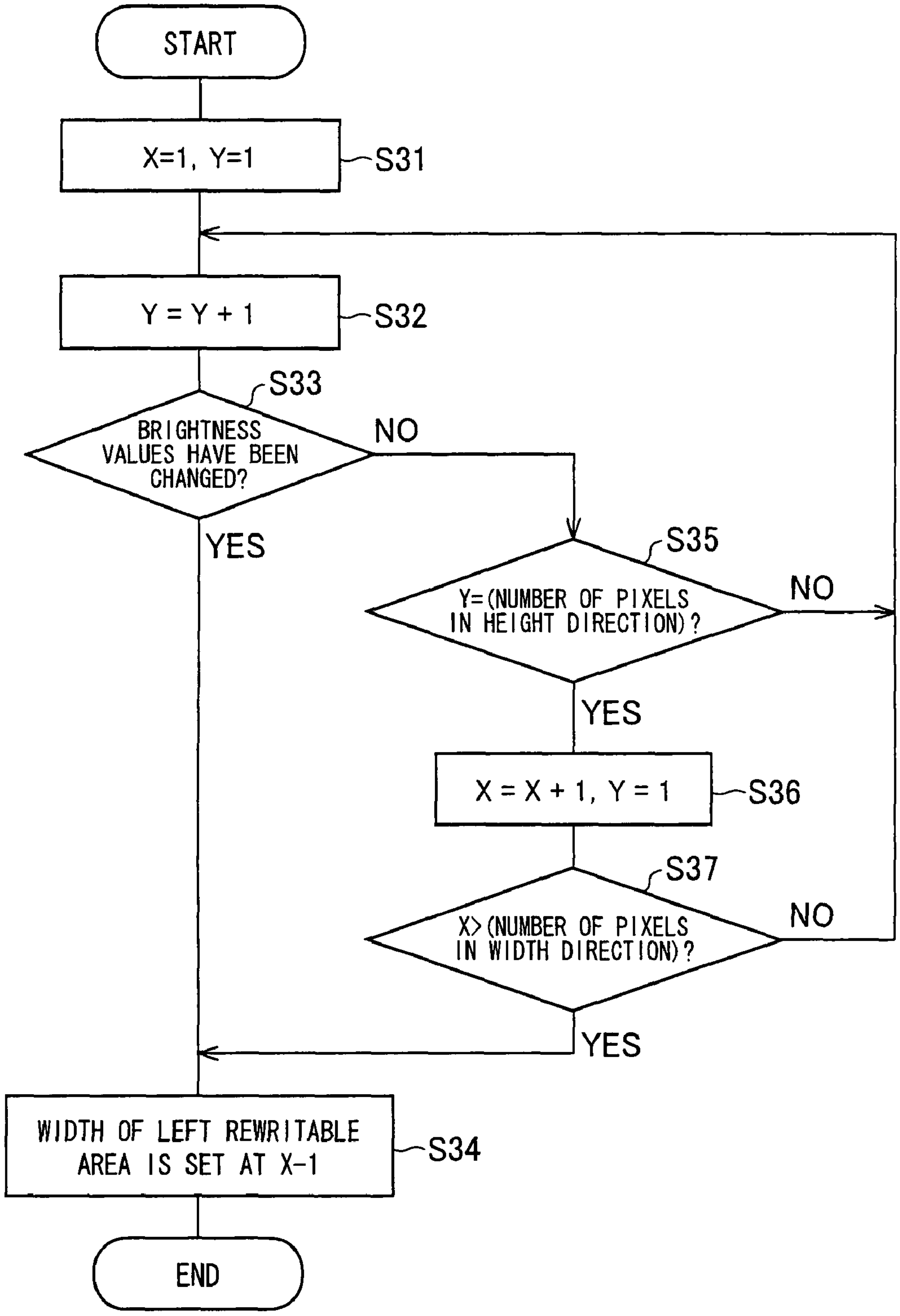
FIG. 11 a flowchart showing the flow of processes in a left rewritable area detection section in the rewritable area detection section.
Figure 12:
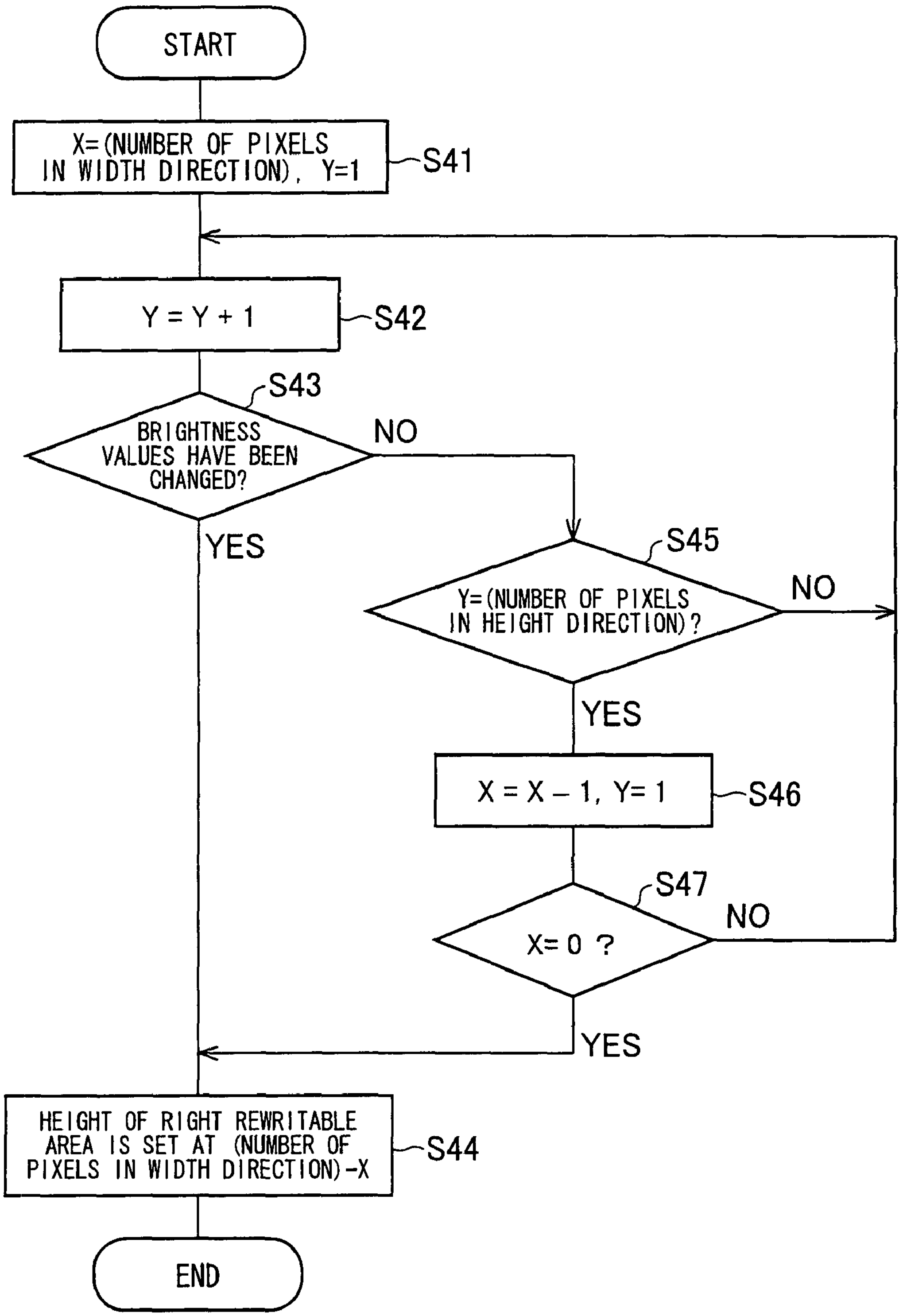
FIG. 12 is a flowchart showing the flow of processes in a right rewritable area detection section in the rewritable area detection section.

FIG. 10 is a flowchart showing the flow of processes in the lower rewritable area detection section 59*b*. FIG. 11 is a flowchart showing the flow of processes in the left rewritable area detection section 59*c*. FIG. 12 is a flowchart showing the flow of processes in the right rewritable area detection section 59*d*.

The flow of processes in each of the lower rewritable area detection section 59*b*, the left rewritable area detection section 59*c*, and the right rewritable area detection section 59*d* is substantially identical with the flow of processes in the upper rewritable area detection section 59*a*, except the order of rows (columns) becoming targets in order to figure out differences and the direction of pixels for comparison. On this account, the flow of processes in each of the lower rewritable area detection section 59*b*, the left rewritable area detection section 59*c*, and the right rewritable area detection section 59*d* is not discussed here.

(Flow of Processes in Mobile Phone 1)

Figure 13:
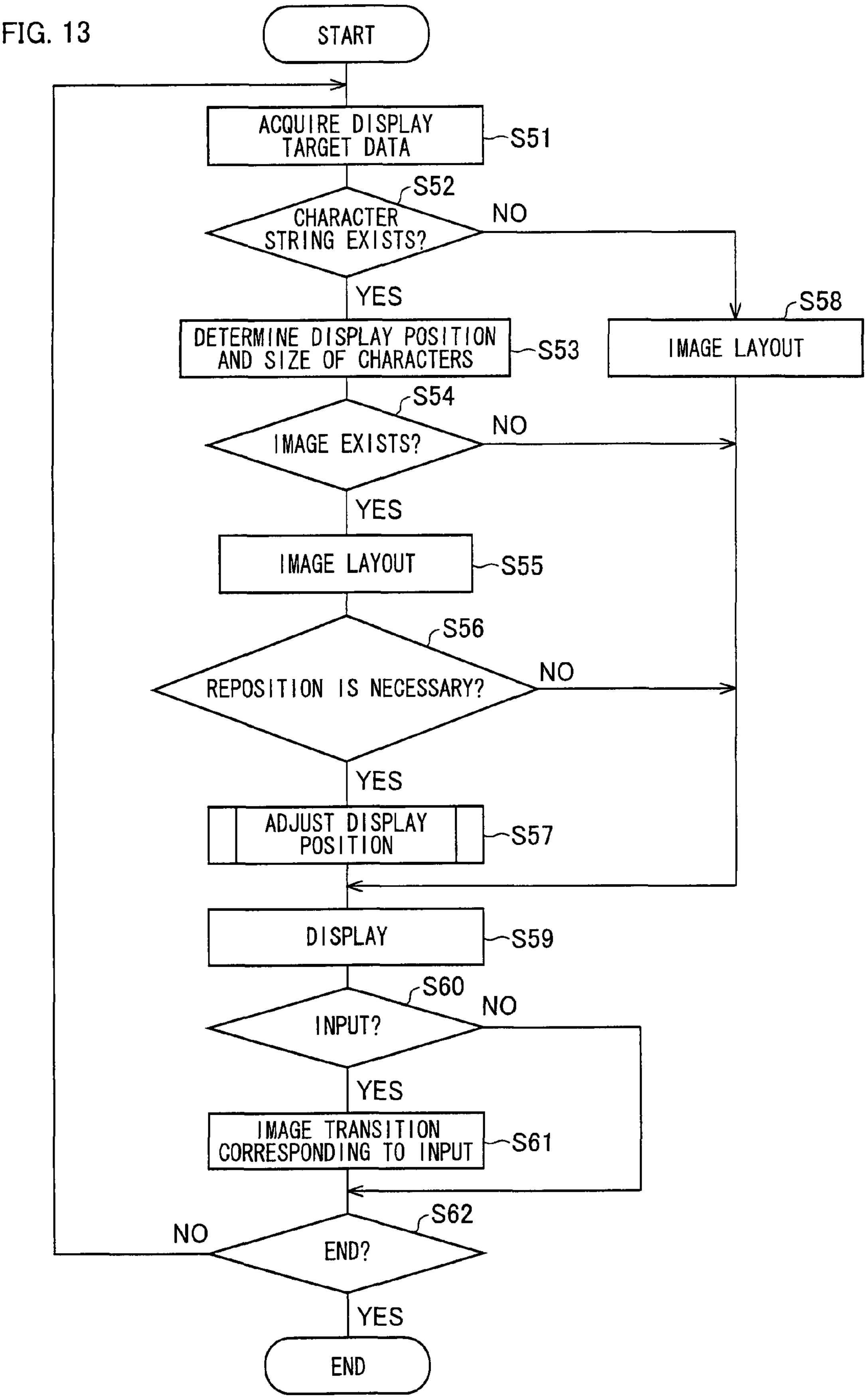
FIG. 13 is a flowchart showing the flow of processes in the mobile phone.

The flow of processes in the mobile phone 1 will be discussed with reference to FIG. 13. FIG. 13 is a flowchart showing the flow of processes in the mobile phone 1. The discussion below assumes that the display target data 61 has already been stored in the storage section 6.

An instruction to display the display target data from the user via the operation section 8 is supplied to the image formation control section 4 via the input/output control section 7. Receiving this instruction, the image formation control section 4 outputs, to the data acquisition section 3, an instruction to acquire the display target data.

Receiving this acquisition instruction, the data acquisition section 3 acquires the display target data 61 from the storage section 6, and outputs the display target data 61 to the reposition control section 51 of the display image formation section 5 (S51).

Receiving the display target data 61, the reposition control section 51 detects whether the display target data 61 includes a character string (S52).

If the display target data 61 does not include a character string, i.e. if the display target data 61 is constituted solely by an image (NO in S52), the reposition control section 51 outputs the display target data 61 to the image disposition section 53, and instructs the image disposition section 53 to determine at which area (image display area) a target image included in the display target data 61 is positioned in the display screen.

Receiving the instruction, the image disposition section 53 determines the image display area with reference to the disposition rule table 62 (S58), and outputs, to the reposition control section 51, coordinates of the image display area. The reposition control section 51 then generates a display image based on the coordinates and outputs the display image to the image formation control section 4 (proceed to S59).

If a character string is included (YES in S52), the reposition control section 51 outputs the display target data to the character string disposition section 52.

Receiving the display target data 61, the character string disposition section 52 determines at which position of the display screen the character string included in the display target data is provided, i.e. determines the character string display area and the size of the character string (S53), and outputs, to the overlapped area detection section 54, the coordinates indicating the position of the character string display area.

The display size of the character string indicates the total area (the number of dots) when all characters to be displayed are disposed in the screen.

The reposition control section 51 then detects whether the display target data 61 includes an image (S54). If the display target data 61 includes an image (YES in S54), the reposition control section 51 outputs the display target data 61 to the image disposition section 53.

Receiving the display target data, the image disposition section 53 determines at which position of the display screen a target image included in the display target data is provided, i.e. determines the image display area, with reference to the disposition rule table 62 (S55), and outputs, to the overlapped area detection section 54, the coordinates of the image display area.

The above-described steps S51-S58 are steps of a display state determination process (display position determination process) carried out by the display state determining section 60.

In case where the user inputs, by using the operation section 8, an instruction to change the size and/or display position of the target image and/or the associated character string, the display start determining section 60 (character string disposition section 52 and image disposition section 53) outputs, to the overlapped area detection section 54, coordinates to which the instruction has been reflected.

Receiving the coordinates, the overlapped area detection section 54 checks (i) whether the character string display area and the image display area are overlapped with one another and (ii) whether the character string display area is displayable within the boundary of the display screen 9*a*, and outputs the results of the checking to the reposition control section 51 (S56). In other words, the overlapped area detection section 54 determines whether the reposition process is necessary, and outputs the determination result to the reposition control section 51.

If the character string display area and the image display area are overlapped with one another or if the character string display area is not displayable within the boundary of the display screen 9*a*, i.e. if the overlapped area detection section 54 determines that the reposition process is necessary (YES in S56), the reposition control section 51 performs a process (display position adjustment process (reposition process)) to adjust a display position (S57). The reposition control section 51 then outputs, to the image formation control section 4, the display image in which the display position has been adjusted.

Receiving the display image, the image formation control section 4 causes the display section 9 to display the display image (S59).

In case where the display target data 61 does not include an image (NO in S54) and in case where neither the character string display area and the image display area are overlapped with one another nor the character string display area goes beyond the boundary of the display screen 9*a*, i.e. the overlapped area detection section 54 determines that the reposition process is unnecessary (NO in S56), the reposition control section 51 generates a display image constituted by a target image and an associated character string or only by a character string and outputs the generated display image to the image formation control section 4, without performing the display position adjustment process. Receiving the display image, the image formation control section 4 causes the display section 9 to display the display image (S59).

Thereafter, if there is a further input from the user, e.g. an input to display the next display target image (YES in S60), the main control section 2 performs a process corresponding to the input (S61). Receiving an input to terminate the operation (YES in S62), the main control section 2 terminates the entire process.

(Flow of Display Position Adjustment Process in Display Image Formation Section 5)

Figure 14:
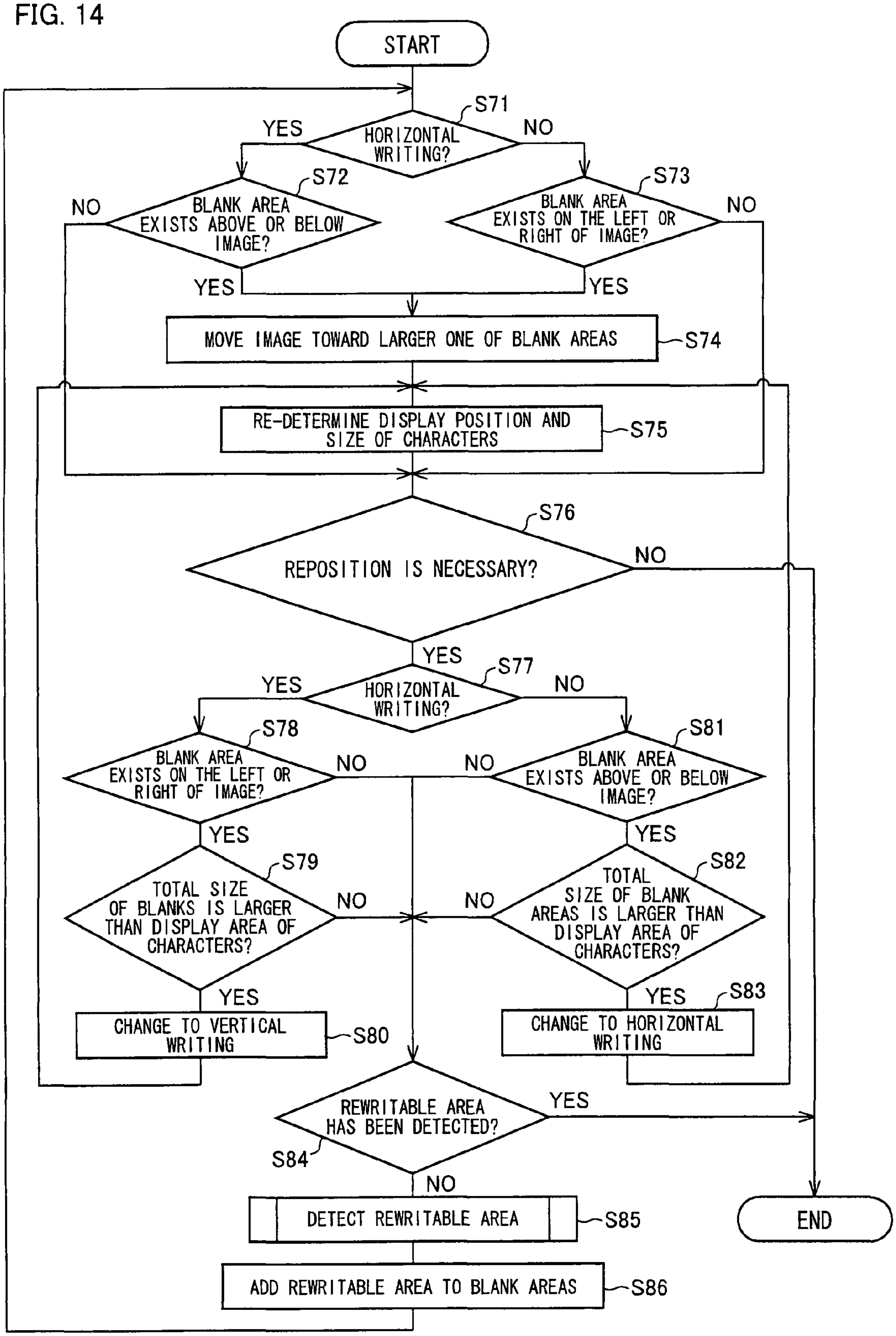
FIG. 14 is a flowchart showing the flow of processes in the display image formation section.

The following will discuss the flow of the display position adjustment process in the display image formation section 5, with reference to FIG. 14. FIG. 14 is a flowchart showing the flow of processes in the display image formation section 5.

Receiving from the overlapped area detection section 54 either information indicating that a character string display area and an image display area are overlapped with one another or information indicating that the character string display area is not displayable within the boundary of the display screen (i.e. a determination result indicating that the reposition process is necessary), the reposition control section 51 outputs an instruction to detect blank areas to the blank area detection section 55.

In response to the instruction, the blank area detection section 55 figures out the sizes of blank areas around the image display area. If the associated character string is horizontally written (YES in S71), the blank area detection section 55 figures out the sizes of blank areas above and below the image display area (S72). If the associated character string is vertically written (NO in S71), the blank area detection section 55 figures out the sizes of blank areas on the left and right of the image display area (S73).

The blank area detection section 55 outputs, to the blank area comparison section 56, blank information in regard to the sizes of the blank areas thus figured out.

In case where there is no blank area above and below or on the left and on the right of the image display area (NO in S72 or S73), the blank area detection section 55 notifies the reposition control section 51 that there is no blank area, and the reposition control section 51 instructs the overlapped area detection section 54 to check whether the character string display area is overlapped with the image display area and whether the character string display area goes beyond the boundary of the display screen (proceed to S76).

Receiving the blank information, the blank area comparison section 56 compares the size of the blank area above the image display area with the size of the blank area below the image display area, in case where the associated character string is horizontally written. In case where the associated character string is vertically written, the blank area comparison section 56 compares the size of the blank area on the left of the image display area with the size of the blank area on the right of the image display area. The blank area comparison section 56 then outputs the comparison result to the reposition control section 51.

Receiving the comparison result, the reposition control section 51 moves the image display area toward the larger one of the blank areas which have been compared with each other (S74). The reposition control section 51 moves the image display area until the larger blank area is substantially eliminated. It is noted that, since the reposition control section 51 is not required to move the image display area until the larger one of the blank areas is completely eliminated, the reposition control section 51 may move the image display area until the blank area acquires a predetermined size.

Thereafter, the reposition control section 51 again instructs the character string disposition section 52 to determine the character string display area (S75). The character string disposition section 52 outputs the coordinates of the character string display area to the overlapped area detection section 54.

The reposition control section 51 outputs the coordinates of the moved image display area to the overlapped area detection section 54.

In response to the aforesaid positional information, the overlapped area detection section 54 checks whether the character string display area and the image display area are overlapped with one another and whether the character string display area goes beyond the boundary of the display screen 9*a*, and outputs the checking result to the reposition control section 51 (S76). In other words, the overlapped area detection section 54 determines whether the reposition process is necessary, and outputs the determination result to the reposition control section 51.

If the character string display area and the image display area are overlapped with one another or if the character string display area goes beyond the boundary of the display screen 9*a*, i.e. if the overlapped area detection section 54 determines that the reposition process is necessary (YES in S76), the reposition control section 51 outputs an instruction to detect blank areas to the blank area detection section 55.

Receiving the instruction, the blank area detection section 55 figures out the sizes of blank areas around the image display area. In doing so, if the associated character string is horizontally written (YES in S77), the blank area detection section 55 figures out the sizes of the blank areas above and below the image display area (S78). If the associated character string is vertically written (NO in S77), the blank area detection section 55 figures out the sizes of the blank areas on the left and right of the image display area (S81).

The blank area detection section 55 outputs, to the blank/character string comparison section 57, blank information in regard to the sizes of the blank areas thus figured out.

In response to the blank information, the blank/character string comparison section 57 compares the size of the character string display area with the total size of the blank areas on the left and right of the image display area, in case where the associated character string is horizontally written (S79). On the other hand, in case where the associated character string is vertically written, the blank/character string comparison section 57 compares the size of the character string display area with the total size of the blank areas above and below of the image display area (S82).

In case where the total size of the blank areas on the left and right of the image display area is not smaller than the size of the character string display area (YES in S79), the blank/character string comparison section 57 outputs, to the character string direction changing section 58, an instruction to change the associated character string to be vertically written.

Also, in case where the total size of the blank areas above and below the image display area is not smaller than the size of the character string display area (YES in S82), the blank/character string comparison section 57 outputs, to the character string direction changing section 58, an instruction to change the associated character string to be horizontally written.

Receiving the instruction, the character string direction changing section 58 changes the horizontally-written associated character string to be vertically written (S80) or changes the vertically-written associated character string to be horizontally written (S83). The character string direction changing section 58 outputs, to the reposition control section 51, information of the changed character string display area.

Receiving the information, the reposition control section 51 again causes the character string disposition section 52 to determine the character string display area (return to S75).

On the other hand, in case where there is no blank area on the left and right of the image display area (NO in S78), in case where there is no blank area above and below the image display area (NO in S81), in case where the total size of the blank areas on the left and right of the image display area is smaller than the size of the character string display area (NO in S79), or in case where the total size of the blank areas above and below the image display area is smaller than the size of the character string display area (NO in S82), the blank area detection section 55 and the blank/character string comparison section 57 outputs, to the reposition control section 51, information indicating one of the cases above.

Receiving the information, the reposition control section 51 checks whether a rewritable areas has been detected (S84). If a rewritable areas has not been detected (NO in S84), the reposition control section 51 outputs an instruction to detect a rewritable area to the rewritable area detection section 59.

Receiving the instruction, the rewritable area detection section 59 detects a rewritable area in the manner as above and outputs rewritable area information to the blank area detection section 55 (S85).

Receiving the rewritable area information, the blank area detection section 55 adds the rewritable area indicated by the rewritable area information to the blank areas which have been detected (S86), so as to detect the blank areas again (return to S71).

If the character string display area and the image display area are not overlapped with one another and the character string display area does not go beyond the boundary of the display screen, i.e. the overlapped area detection section 54 determines that the reposition process is unnecessary (NO in S76) or if a rewritable area has already been detected (YES in S84), the reposition control section 51 terminates the series of processes.

(Flow of Processes in Overlapped Area Detection Section 54)

Figure 21:
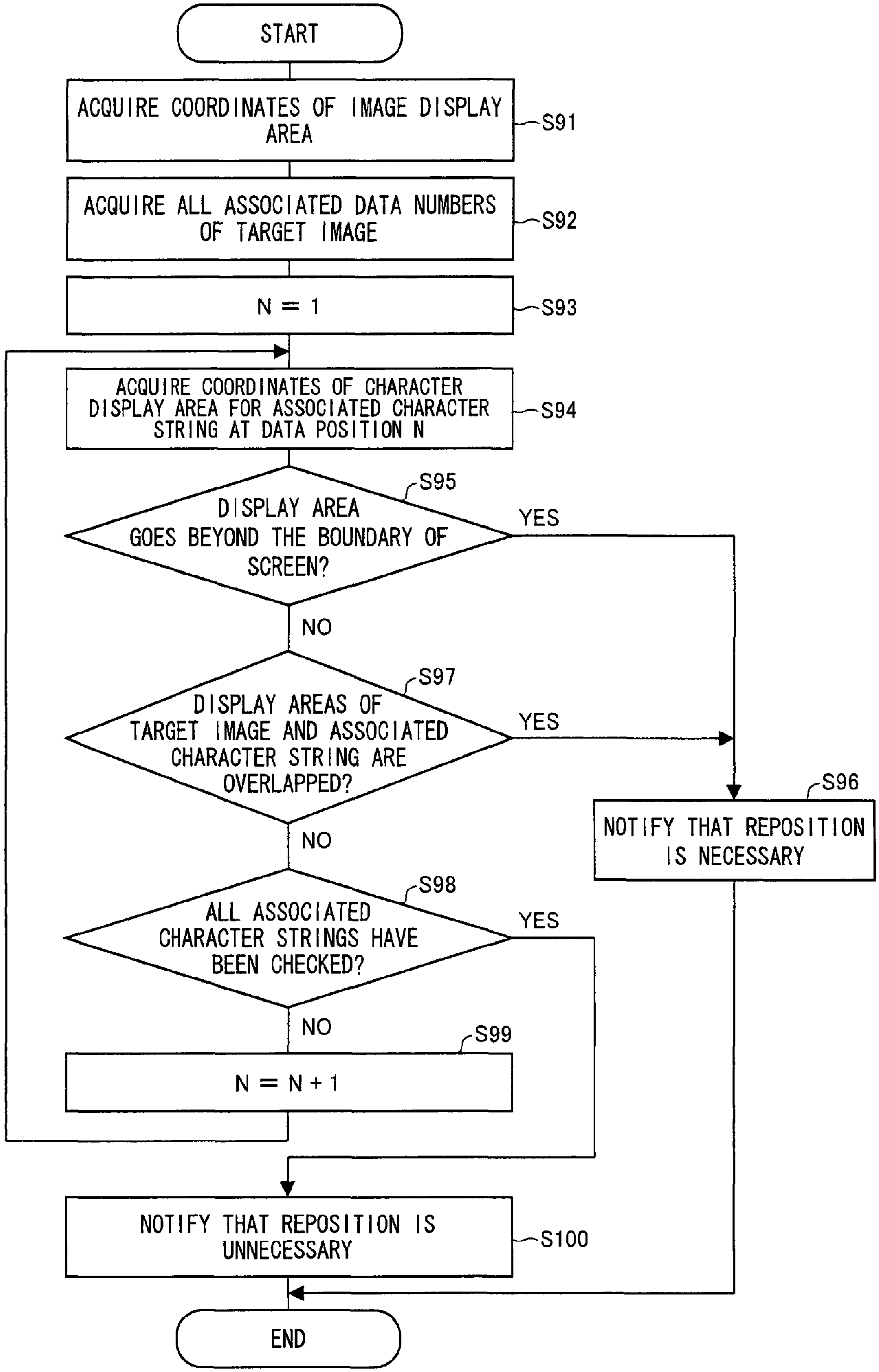
FIG. 21 is a flowchart showing an example of the flow of processes in an overlapped area detection section.

The following will discuss an example of the flow of processes (reposition necessity determination process) in the overlapped area detection section 54, with reference to FIG. 21. FIG. 21 is a flowchart showing an example of the flow of processes in the overlapped area detection section 54.

The overlapped area detection section 54 stores, in its memory (not illustrated), coordinates indicating the position of the character string display area which has been determined by the character string disposition section 52 and coordinates indicating the position of the image display area which has been determined by the image disposition section 53. The following will describe the flow of processes in case where plural character strings are associated with a single target image.

First, the overlapped area detection section 54 acquires, from the memory, coordinates of an image display area where a target image is displayed (S91). The display area has a rectangular shape defined by the display start position and the width and height of the display data. The display start position and the width and height of the display data change in accordance with the character size and the direction of characters, which are determined by an instruction from the user.

The overlapped area detection section 54 then acquires all associated data numbers (numbers of the associated character strings) of the target image, which are included in display target data 61 stored in the storage section 6 (S92). Thereafter, the overlapped area detection section 54 sets the counter thereof at "1" (S93).

Subsequently, the overlapped area detection section 54 acquires, from the memory, coordinates of the character string display area where the first associated character string is displayed (S94).

The overlapped area detection section 54 then determines if the first character string display area goes beyond the boundary of the display screen (S95). When a character string display area goes beyond the boundary of a screen, XY coordinates of one of the upper, lower, left, and right edges of the display area does not fall within the range of XY coordinates defining the entire display area of the display screen.

If it is determined that the first character string display area goes beyond the boundary of the display screen (YES in S95), the overlapped area detection section 54 notifies the reposition control section 51 of the necessity of the reposition (S96).

On the other hand, if it is determined that the first character string display area does not go beyond the boundary of the display screen (NO in S95), the overlapped area detection section 54 checks whether the image display area is overlapped with the first character string display area (S97). When display areas are overlapped with one another, either one of the following conditions is satisfied: at least one of four sides defining one display area (display rectangle) intersects with at least one of four sides defining the other display area; and one display area is completely included in the other display area.

If it is determined that the image display area is overlapped with the first character string display area (YES in S97), the overlapped area detection section 54 notifies the reposition control section 51 of the necessity of the reposition (S96).

On the other hand, if it is determined that the image display area is not overlapped with the first character string display area (NO in S97), the overlapped area detection section 54 checks if the aforesaid checking has been performed for all associated character strings (S98).

If the aforesaid checking has not been performed for all associated character strings (NO in S98), the overlapped area detection section 54 adds "1" to the counter and acquires, from the memory, coordinates of a character string display area where the second associated character string is displayed (return to S94).

On the other hand, in case where the aforesaid checking ahs been performed for all character strings (YES in S98), the overlapped area detection section 54 notifies the reposition control section 51 of the non-necessity of the reposition (S100).

In other words, in the reposition necessity determination process, the overlapped area detection section 54 performs checking of overlap and 'going beyond' for all of plural associated character strings, and determines that the reposition is necessary if at least one overlap or 'going beyond' is found.

(Specific Example of Relative Position Adjustment)

Figure 15:
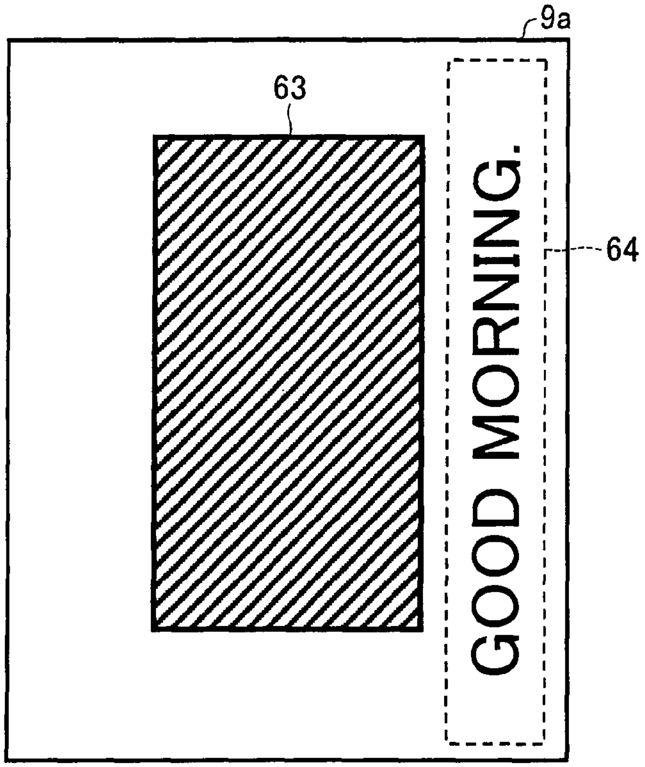
FIG. 15 shows a state in which the associated character string shown in FIG. 6 is changed to vertical writing and the position of the character string display area is changed, so that the character string display area has become displayable in the display screen.
Figure 16:
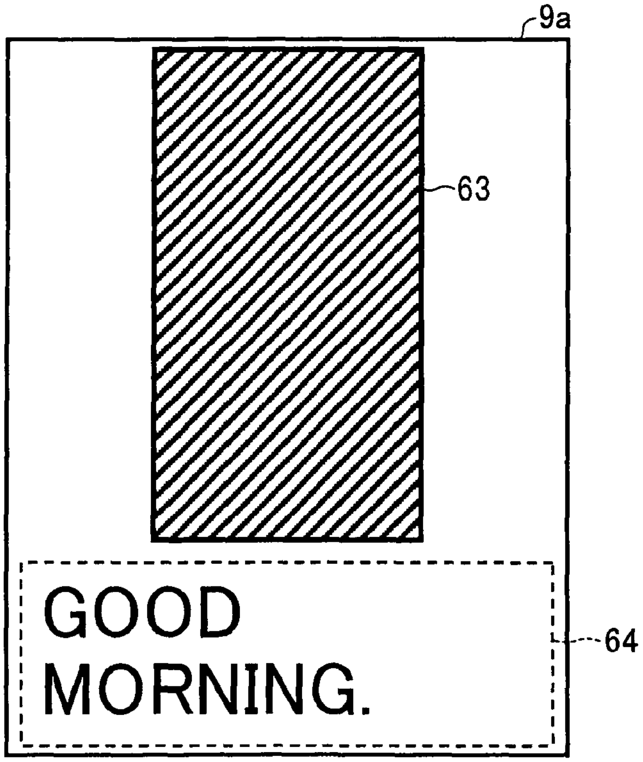
FIG. 16 shows a state in which the associated character string shown in FIG. 6 is moved upward and displayed in two lines, so that the character string display area has become displayable in the display screen.

A specific example of relative position adjustment of a character string display area and an image display area will be described with reference to FIGS. 5-6 and 15-19. FIG. 15 shows a state in which the associated character string shown in FIG. 6 is changed to vertical writing and the position of the character string display area is changed, so that the character string display area is displayable in the display screen. FIG. 16 shows a state in which the associated character string shown in FIG. 6 is moved upward and displayed in two lines, so that the character string display area is displayable in the display screen.

When the size of the associated character string shown in FIG. 5 is enlarged in line with an instruction from the user, the character string display area 64 may go beyond the boundary of the display screen 9*a* as shown in FIG. 6. In such a case, as shown in FIG. 15, the associated character string is changed from horizontal writing to vertical writing and the position of the character string display area is changed from the under side of the display screen 9*a* to the right side thereof. This allows the associated character string to be displayable within the boundary of the display screen.

Alternatively, as shown in FIG. 16, the image display area 63 is moved to the upper side of the display screen 9*a* so that the character string display area 64 is vertically enlarged and the associated character string is displayed in two lines. As a result of this, the associated character string can be displayed within the boundary of the display screen.

In the discussion above, a change in the position of the target image is preferred to a change in the direction of the associated character string. Alternatively, a change in the direction of the associated character string may be preferred.

Figure 17:
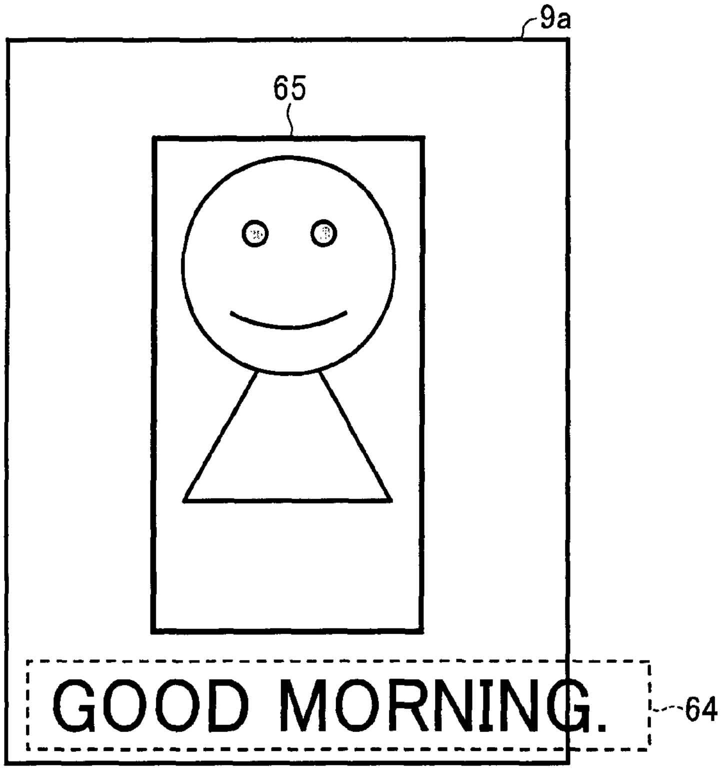
FIG. 17 shows an example in which a target image different from the target image shown in FIG. 5 and the associated character string are displayed in the same display screen.
Figure 18:
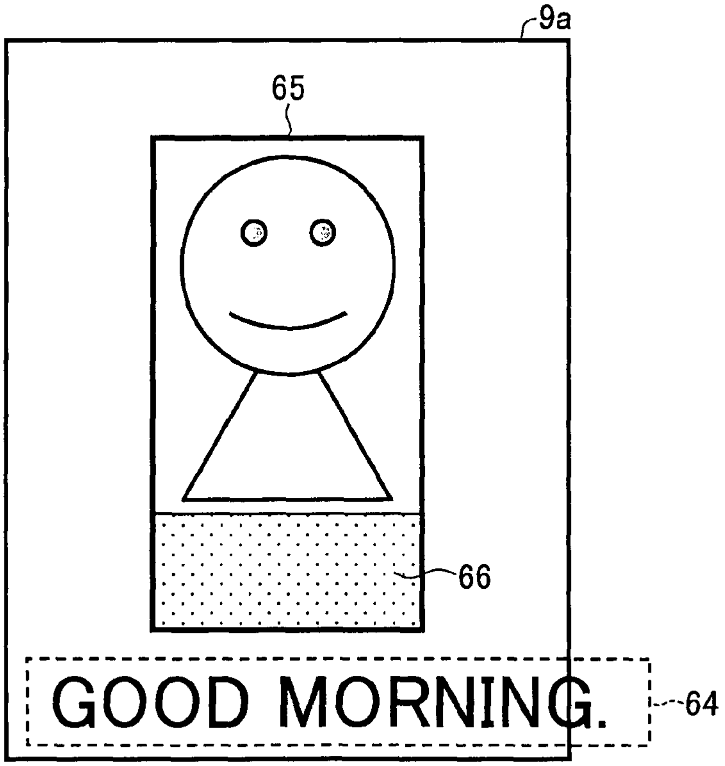
FIG. 18 shows an example of a rewritable area in a target image.

FIG. 17 shows an example in which a target image different from the target image shown in FIG. 5 and the associated character string are displayed in the same display screen. FIG. 18 shows an example of a rewritable area in a target image. FIG. 19 shows a state in which the character string display area is overlapped with the rewritable area and the associated character string is displayed in two lines, so that the character string display area is disposed to be displayable in the display screen.

As shown in FIG. 17, in case where the character string display area 64 goes beyond the boundary of the display screen 9*a*, the image display area 65 may be moved or the direction and position of the character string display area 64 may be changed as discussed above. Alternatively, a rewritable area may be used.

As shown in FIG. 18, a rewritable area 66 exists below an image in the image display area 65. This rewritable area 66 has a background with a single color. As shown in FIG. 19, a part of the character string display area 64 is arranged to overlap the rewritable area 66 and the associated character string is arranged to be displayed in two lines. With this, it is possible to display the associated character string within the boundary of the display screen.

In the discussion above, a change in the position of the associated character string and a change in the direction of the associated character string are preferred to the use of the rewritable area. Alternatively, the use of the rewritable area may be preferred. The disposition rule table 62 may define which one of the above-described ways is preferred. The reposition control section 51 may refer to the disposition rule table 62 which defines the preference, and perform the display position adjustment process in line with the rule defined in the disposition rule table 62.

(Effects of Mobile Phone 1)

As discussed above, in the mobile phone 1, the reposition control section 51 adjusts at least one of the positions of an image display area and a character string display area in such a way as to cause these areas to be displayable in a single display screen, by using blank areas detected by the blank area detection section 55.

This makes it possible to efficiently display a target image and an associated character string in a single display screen of a display apparatus.

Furthermore, the rewritable area detection section 59 detects a rewritable area and the reposition control section 51 causes the character string display area to overlap the detected rewritable area. This expands the possibilities of displaying a target image and an associated character string in a single display screen of a display apparatus.

VARIANT EXAMPLES

The present invention is not limited to the description of the embodiments above, but may be altered by a skilled person within the scope of the claims. An embodiment based on a proper combination of technical means disclosed in the embodiment is encompassed in the technical scope of the present invention.

In the example above, the entire display area is identical with the whole display screen 9*a*. Alternatively, the entire display area may be a window displayed on the display screen 9*a*. In this case, the size of the entire display area is changed as the user changes the size of the window. In accordance with the change in size, relative positions of the image display area and the character string display area may be adjusted.

In the discussion above, the blank area detection section 55 figures out the sizes of blank areas above and below the image display area if the associated character string is horizontally written, or figures out the sizes of blank areas on the left and right of the image display area if the associated character string is vertically written. Alternatively, the sizes of blank areas above, below, on the left, and on the right of the image display area may be figured out irrespective of the direction of the associated character string.

A method of detecting a rewritable area by the rewritable area detection section 59 is not limited to the above. For example, dispersion in brightness values of the entire target image is detected, and an area which is around the periphery of the target image and in which dispersion in brightness values falls within a predetermined range is chosen as a rewritable area. However, the aforesaid method in which a rewritable area is detected from four directions (from above, below, left, and right) is preferable because processing load for the detection of rewritable area is small.

In addition to the above, a rewritable area may be detected by using an indicator other than brightness values. For example, variation in tones of pixels expressing the target image may be detected.

The main display data may be a moving image. A movie and its subtitle can be represented by displaying a moving image and a character string associated therewith in a single display screen.

In case where the main display data is a moving image, the image formation control section 4 may display an associated character string (auxiliary display data) associated with the moving image, for a predetermined period of time (e.g. 5 seconds) after a predetermined period of time (e.g. 1 second) has passed from the start of the display of the moving image. That is to say, the storage section 6 may store a display schedule indicating that how long an associated character string is displayed and how long the start of the display of the associated character string falls behind the start of the display of the moving image, and the image formation control section 4 may display the associated character string at a predetermined timing on the display section 9, with reference to the display schedule.

In case where the disposition rule table 62 indicates that an associated character string cannot be repositioned but the overlapped area detection section 54 determines that the reposition of the associated character string is necessary, the image formation control section 4 may display the associated character string by means of animation effects such that (i) the associated character string is scrolled in a particular display range in the display screen or (ii) after a part of the associated character string is displayed within a particular display range, the remaining part of the associated character string is displayed in the display range after a predetermined period of time elapses. In such cases, the disposition rule table 62 may define that the display using the animation effects may be performed if the reposition is prohibited even if the reposition is necessary.

The blocks in the mobile phone 1, the display image formation section 5 in particular, may be realized by hardware logic. Alternatively, the blocks may be realized by software, with the use of a CPU as follows.

That is, the mobile phone 1 may include members such as: a CPU (Central Processing Unit) that executes instructions of a control program realizing the functions; a ROM (Read Only Memory) recording the program; a RAM (Random Access Memory) on which the program is executed; and a storage device (recording medium) such as a memory, which stores the program and various kinds of data. The objective of the present invention can be achieved in the following manner: program code (e.g. an executable code program, intermediate code program, and source program) of the control program of the mobile phone 1, the control program being software for realizing the functions, is recorded on a recording medium in a computer-readable manner, this recording medium is supplied to the mobile phone 1, and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc including an optical disc, such as a CD-ROM/MO/MD/DVD/CD-R; a card, such as an IC card (inclusive of a memory card); and a semiconductor memory, such as a mask ROM, an EPROM (Erasable Programmable Read Only Memory), an EEPROM (Electrically Erasable Programmable Read Only Memory), or a flash ROM.

Alternatively, the mobile phone 1 may be capable of being connected to a communications network, allowing the program code to be supplied via the communications network. Non-limiting examples of the communications network include the Internet, intranet, extranet, LAN, ISDN, VAN CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized by a carrier wave or as data signal sequence, which are realized by electronic transmission of the program code.

As discussed above, the display apparatus is preferably arranged such that the blank area detection means detects sizes of blank areas above and below the image display area, and the reposition means includes blank comparison means which compares the size of the blank area above the image display area with the size of the blank area below the image display area, and the reposition means moves the image toward the larger one of the blank areas above and below the image display area.

According to this arrangement, among blank areas around the image display area, the sizes of the blank areas above and below the image display area are detected by the blank area detection means, and the blank comparison means compares the size of the upper blank area with the size of the lower blank area. The reposition means then moves the image towards the larger one of the blank areas above and below the image display area. For example, in case where the size of the upper blank area is larger than the size of the lower blank area, the reposition means moves the image upward.

As a result, a display area for the character string is enlarged when the character string is horizontally written, i.e. when the character string exists above or below the image display area.

The display apparatus is preferably arranged such that the blank area detection means detects sizes of blank areas on the left and right of the image display area, and the reposition means includes blank comparison means which compares the size of the blank area on the left of the image display area with the size of the blank area on the right of the image display area, and the reposition means moves the image toward the larger one of the blank areas on the left and right of the image display area According to this arrangement, among blank areas around the image display area, the sizes of the blank areas on the left and right of the image display area are detected by the blank area detection means, and the blank comparison means compares the size of the left blank area with the size of the right blank area. The reposition means then moves the image towards the larger one of the blank areas on the left and right of the image display area. For example, in case where the size of the left blank area is larger than the size of the right lower blank area, the reposition means moves the image to the left.

As a result, a display area for the character string is enlarged when the character string is vertically written, i.e. when the character string exists on the left or right of the image display area.

The display apparatus is preferably arranged such that the blank area detection means detects sizes of blank areas above and below or on the left and on the right of the image display area, and the reposition means includes: area comparison means for comparing the total size of the blank areas above and below or on the left and on the right of the image display area with the size of the character string display area; and character string direction changing means for changing the direction of the character string for 90° if the total size of the blank areas is identical with or larger than the size of the character string display area.

According to this arrangement, the blank area detection means detects the sizes of blank areas above and below the image display area or on the left and on the right of the image display area. Then the area comparison means compares the total size of the upper and lower blank areas or the left and right blank areas with the size of the character string display area. If the total size is not smaller than the size of the character string display area, the character string direction changing means changes the direction of the character string for 90°.

When the total size of the upper and lower blank areas is not smaller than the size of the character string display area, a vertically-written character string may be changed to be horizontally written and disposed above and below the image display area.

When the total size of the left and right blank areas is not smaller than the size of the character string display area, a horizontally-written character string may be changed to be vertically written and disposed on the left or right of the image display area.

In other words, the character string direction changing means changes the direction of the character string display area for 90°, when horizontal writing can be changed to vertical writing or vice versa.

This expands the possibilities of displaying an image and an associated character string in a single display screen.

Preferably the display apparatus preferably further includes rewritable area detection means for detecting a rewritable area which is in the image and is an area where the character string is writable, and the blank area detection means assumes that the rewritable area is a part of the blank area.

According to this arrangement, the rewritable area detection means detects a rewritable area in an image, and the blank area detection means assumes the rewritable area as a part of a blank area. In other words, the blank area detection means assumes, as a blank area, an area in which the rewritable area is added to the original blank area.

Therefore, even when a blank area is small, the image display area and the character string display area can be appropriately disposed by using the rewritable area.

The rewritable area is an area in a target image, where an amount of information is small. For example, the rewritable area is an area in a target image, where dispersion (variation) of brightness values is below a predetermined threshold.

The display apparatus is preferably arranged such that the rewritable area detection means detects, in the image and as the rewritable area, an area in which dispersion of brightness values is below a predetermined threshold.

An area where dispersion of brightness values is below a predetermined threshold, the area is likely to have a small amount of information. On this account, when the area is used as the character string display area, an amount of information read out from a display target is highly unlikely to significantly decrease.

According to the arrangement above, an area in a display target image, where dispersion of brightness values is below a predetermined threshold, is identified as a rewritable area, and hence a rewritable area is easily detected by performing comparison of brightness values.

The display apparatus is preferably arranged such that the reposition means moves at least one of the image and the character string, with reference to a disposition rule table which defines whether the image or the character string is preferentially moved.

According to this arrangement, the reposition means moves at least one of the image and the character string, with reference to the order of preference defined in the disposition rule table.

This makes it possible to adjust the position of the image or the character string, while keeping one of them in a highly viewable state.

The main display data may be an image, the main display data display area may be an image display area, the auxiliary display data may be a character string associated with the image, and the auxiliary display data display area may be a character string display area.

According to the arrangement above, an image and a character string associated therewith are efficiently displayed in a single display screen, and hence the image and the character string are displayed with a good viewability.

The technical scope of the present invention encompasses a display program which causes a computer to function as the means of the aforesaid display apparatus, and a computer-readable storage medium storing the display program.

In the explanations of the means above, an image may be regarded as main display data and a character string may be regarded as auxiliary display data.

The present invention may be represented as follows: a display device, displaying main display data and auxiliary display data associated with the main data, includes: initial state calculation means for calculating an initial state with reference to display target data indicating positions where the main display data and the auxiliary display data are displayed; reposition necessity determining means for determining whether reposition is required in the initial state; blank area detection means for detecting a blank area whose size is determined by subtracting, from an entire area of the display screen, an area where the main display data is displayed and an area where the auxiliary display data is displayed; and reposition means for performing the reposition of the main display data and the auxiliary display data by using the blank area, when the reposition necessity determining means determines that the reposition is necessary.

According to the present invention, a target image and an associated character string associated with the target image are efficiently displayable in a single screen. The present invention can therefore be adopted to a display apparatus in which a target image and an associated character string are simultaneously displayed in a single screen, particularly to a mobile display apparatus with a small screen.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display device displaying an image and a character string associated with the image, the display device including a display section and further comprising:

a display position determining section for determining display positions of the image and the character string in a display screen;

a reposition necessity determining section for determining whether it is necessary to perform a reposition process by which at least one of the positions of the image and the character string is changed;

a blank area detection section for detecting a blank area whose size is determined by subtracting, from an entire area of the display screen, an image display area where the image is displayed and a character string display area where the character string is displayed; and a reposition section for changing at least one of the positions of the image and the character string, when the reposition necessity determining section determines that the reposition process is necessary, wherein:

the blank area detection section detects sizes of blank areas above and below the image display area or on the left and on the right of the image display area;

in a case where the character string is horizontally written, the reposition section compares the total size of the blank areas on the left and on the right with the size of the character string display area;

in a case where the character string is vertically written, the reposition section compares the total size of the blank areas above and below the image display area with the size of the character string display area; and in a case where the total size of the blank areas is identical with or larger than the size of the character string display area, the reposition section rotates the direction of the character string by 90°.

2. A display device adjusting a position of at least one of an image and a character string associated with the image, in order to display the image and the character string in a single display screen of the display device, the display device including a display section and further comprising:

a blank area detection section for detecting a blank area whose size is determined by subtracting, from an entire area of the display screen, an image display area where the image is displayed and a character string display area where the character string is displayed; and a reposition section for changing, by using the blank area, a position or size of at least one of the image and the character string from an initial state, in such a way as to allow the image and the character string to be displayed in the single display screen, wherein:

the blank area detection section detects sizes of blank areas above and below the image display area or on the left and on the right of the image display area;

in a case where the character string is horizontally written, the reposition section compares the total size of the blank areas on the left and on the right with the size of the character string display area;

in a case where the character string is vertically written, the reposition section compares the total size of the blank areas above and below the image display area with the size of the character string display area; and in a case where the total size of the blank areas is identical with or larger than the size of the character string display area, the reposition section rotates the direction of the character string by 90°.

3. The display device as defined in claim 1 or 2, wherein, the blank area detection section detects sizes of blank areas above and below the image display area, and the reposition section includes a blank comparison section which compares the size of the blank area above the image display area with the size of the blank area below the image display area, and the reposition section moves the image toward the larger one of the blank areas above and below the image display area.

4. The display device as defined in claim 1 or 2, wherein, the blank area detection section detects sizes of blank areas on the left and right of the image display area, and the reposition section includes a blank comparison section which compares the size of the blank area on the left of the image display area with the size of the blank area on the right of the image display area, and the reposition section moves the image toward the larger one of the blank areas on the left and right of the image display area.

5. The display device as defined in claim 1 or 2, further comprising a rewritable area detection section for detecting a rewritable area which is in the image and is an area where the character string is writable, the blank area detection section assuming that the rewritable area is a part of the blank area.

6. The display device as defined in claim 5, wherein, the rewritable area detection section detects, in the image and as the rewritable area, an area in which dispersion of brightness values is below a predetermined threshold.

7. The display device as defined in claim 1 or 2, wherein, the reposition section moves at least one of the image and the character string, with reference to a disposition rule table which defines whether the image or the character string is preferentially moved.

8. A non-transitory computer-readable storage medium encoded with a computer executable display program for performing a process in a display apparatus which displays an image and a character string associated with the image, the process comprising the steps of:

determining display positions of the image and the character string in a display screen;

determining whether it is necessary to perform a reposition process by which at least one of the positions of the image and the character string is changed;

detecting a blank area whose size is determined by subtracting, from an entire area of the display screen, an image display area where the image is displayed and a character string display area where the character string is displayed; and changing at least one of the positions of the image and the character string, if the reposition necessity determining means determines that the reposition process is necessary, wherein:

the sizes of blank areas above and below the image display area or on the left and on the right of the image display area are detected;

in a case where the character string is horizontally written, comparing the total size of the blank areas on the left and on the right with the size of the character string display area;

in a case where the character string is vertically written, comparing the total size of the blank areas above and below the image display area with the size of the character string display area; and in a case where the total size of the blank areas is identical with or larger than the size of the character string display area, rotating the direction of the character string by 90°.

9. A non-transitory computer-readable storage medium storing a display program for performing a process in a display apparatus which adjusts a position of at least one of an image and a character string associated with the image, in order to display the image and the character string in a single display screen of the display apparatus, the process comprising the steps of:

detecting a blank area whose size is determined by subtracting, from an entire area of the display screen, an image display area where the image is displayed and a character string display area where the character string is displayed; and changing, by using the blank area, a position or size of at least one of the image and the character string from an initial state, in such a way as to allow the image and the character string to be displayed in the single display screen, wherein:

the sizes of blank areas above and below the image display area or on the left and on the right of the image display area are detected;

in a case where the character string is horizontally written, comparing the total size of the blank areas on the left and on the right with the size of the character string display area;

in a case where the character string is vertically written, comparing the total size of the blank areas above and below the image display area with the size of the character string display area; and in a case where the total size of the blank areas is identical with or larger than the size of the character string display area, rotating the direction of the character string by 90°.

10. A method for display for a display device which adjusts a position of at least one of an image and a character string associated with the image, in order to display the image and the character string in a single display screen of the display device, the method comprising the steps of:

detecting a blank area whose size is determined by subtracting, from an entire area of the display screen, an image display area where the image is displayed and a character string display area where the character string is displayed; and changing, by using the blank area, a position or size of at least one of the image and the character string from an initial state, in such a way as to allow the image and the character string to be displayed in the single display screen, wherein:

detecting sizes of blank areas above and below the image display area or on the left and on the right of the image display area;

in a case where the character string is horizontally written, comparing the total size of the blank areas on the left and on the right with the size of the character string display area;

in a case where the character string is vertically written, comparing the total size of the blank areas above and below the image display area with the size of the character string display area; and in a case where the total size of the blank areas is identical with or larger than the size of the character string display area, rotating the direction of the character string by 90°.

* * * * *